US011887475B1

(12) United States Patent
Riggs et al.

(10) Patent No.: US 11,887,475 B1
(45) Date of Patent: Jan. 30, 2024

(54) SYSTEMS AND METHODS FOR CONTROLLING A PROGRAMMABLE TRAFFIC LIGHT

(71) Applicant: FORD GLOBAL TECHNOLOGIES, LLC, Dearborn, MI (US)

(72) Inventors: Timothy S. Riggs, Latrobe, PA (US); Thomas D. McMenamin, Jr., Oakmont, PA (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/549,229

(22) Filed: Dec. 13, 2021

(51) Int. Cl.
  *G08G 1/095* (2006.01)
  *G08G 1/07* (2006.01)
(52) U.S. Cl.
  CPC .............. *G08G 1/095* (2013.01); *G08G 1/07* (2013.01)
(58) Field of Classification Search
  CPC ................................. G08G 1/095; G08G 1/07
  See application file for complete search history.

(56) References Cited

U.S. PATENT DOCUMENTS

| 8,063,935 | B2 | 11/2011 | Leleve et al. |
| 8,139,117 | B2 | 3/2012 | Dwinell et al. |
| 8,319,662 | B1 | 11/2012 | Bontemps et al. |
| 8,436,748 | B2 | 5/2013 | Mimeault et al. |
| 10,110,795 | B2 | 10/2018 | Kraeling et al. |
| 10,220,852 | B2 | 3/2019 | Valois |
| 2013/0049985 | A1* | 2/2013 | Eisenson ............ G08G 1/0965 340/902 |
| 2017/0337819 | A1* | 11/2017 | Wei ..................... G08G 1/166 |
| 2021/0012656 | A1* | 1/2021 | Davis, Jr. .............. G08G 1/164 |
| 2021/0107566 | A1 | 4/2021 | Seegmiller et al. |
| 2021/0108936 | A1 | 4/2021 | Seegmiller et al. |

OTHER PUBLICATIONS

Duval, "Arduino Traffic Light Controller w/ Remote Control", instructables.com, (http://www.instructables.com/Arduino-Traffic-Light-Controller-wRemote-Control) (Oct. 16, 2009), 5 pages.

* cited by examiner

*Primary Examiner* — Daryl C Pope
(74) *Attorney, Agent, or Firm* — Frank MacKenzie; Brooks Kushman P.C.

(57) ABSTRACT

A traffic light control system configured to provide instructions to a traffic light for testing performance of an autonomous vehicle as it approaches the traffic light includes a controller. The controller includes a transceiver in communication with the traffic light and a computer-readable memory storing a plurality of operation routines for the traffic light. The controller is configured to: select an operation routine of the plurality of operation routines on the computer-readable memory; and provide a control signal via the transceiver to the traffic light to control operation of the traffic light according to the selected operation routine. Controlling operation of the traffic light includes turning on or off at least one of a plurality of light emitters of the at least one traffic light and/or changing a brightness, frequency, or intensity of at least one of the plurality of light emitters of the traffic light.

18 Claims, 20 Drawing Sheets

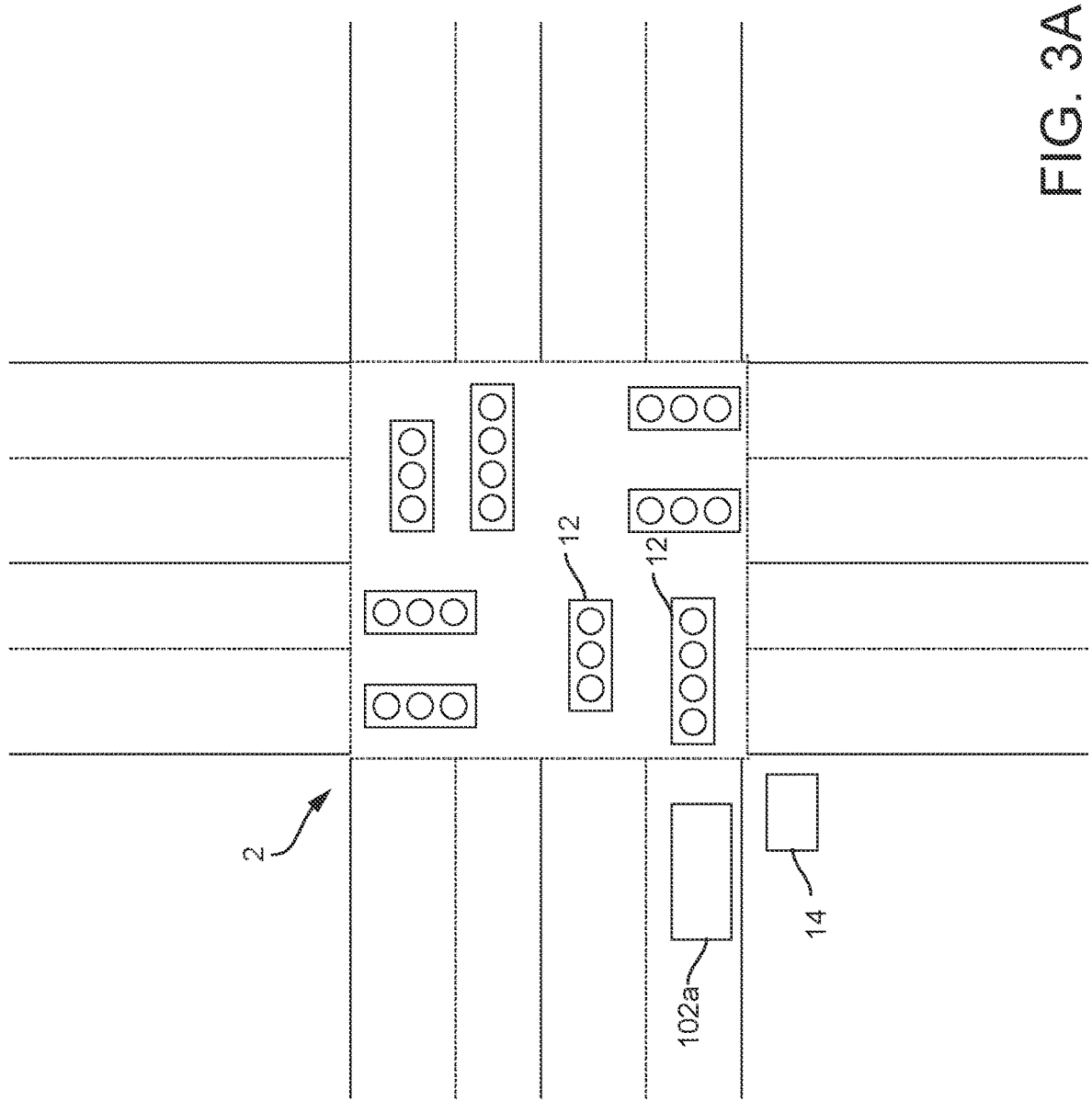

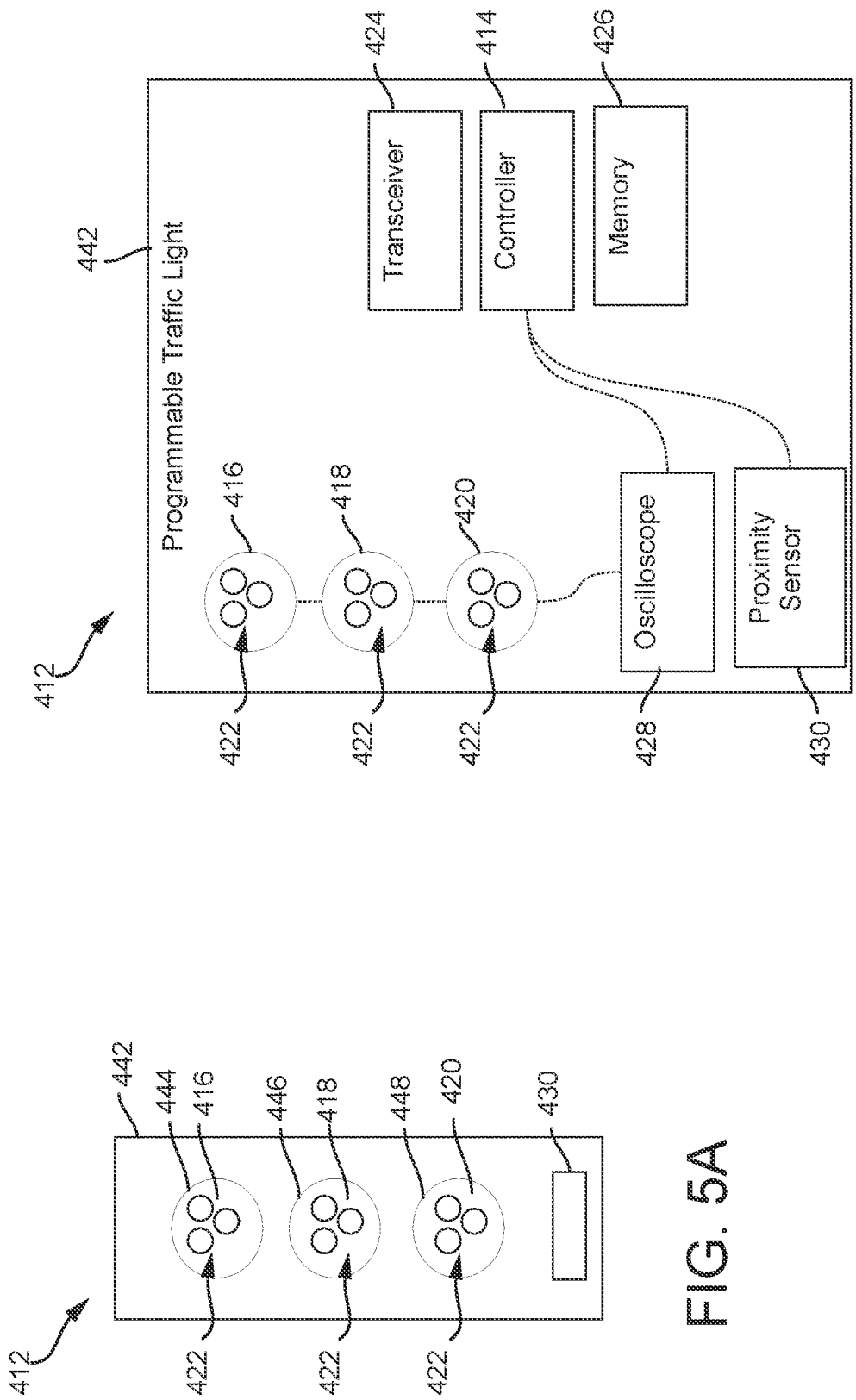

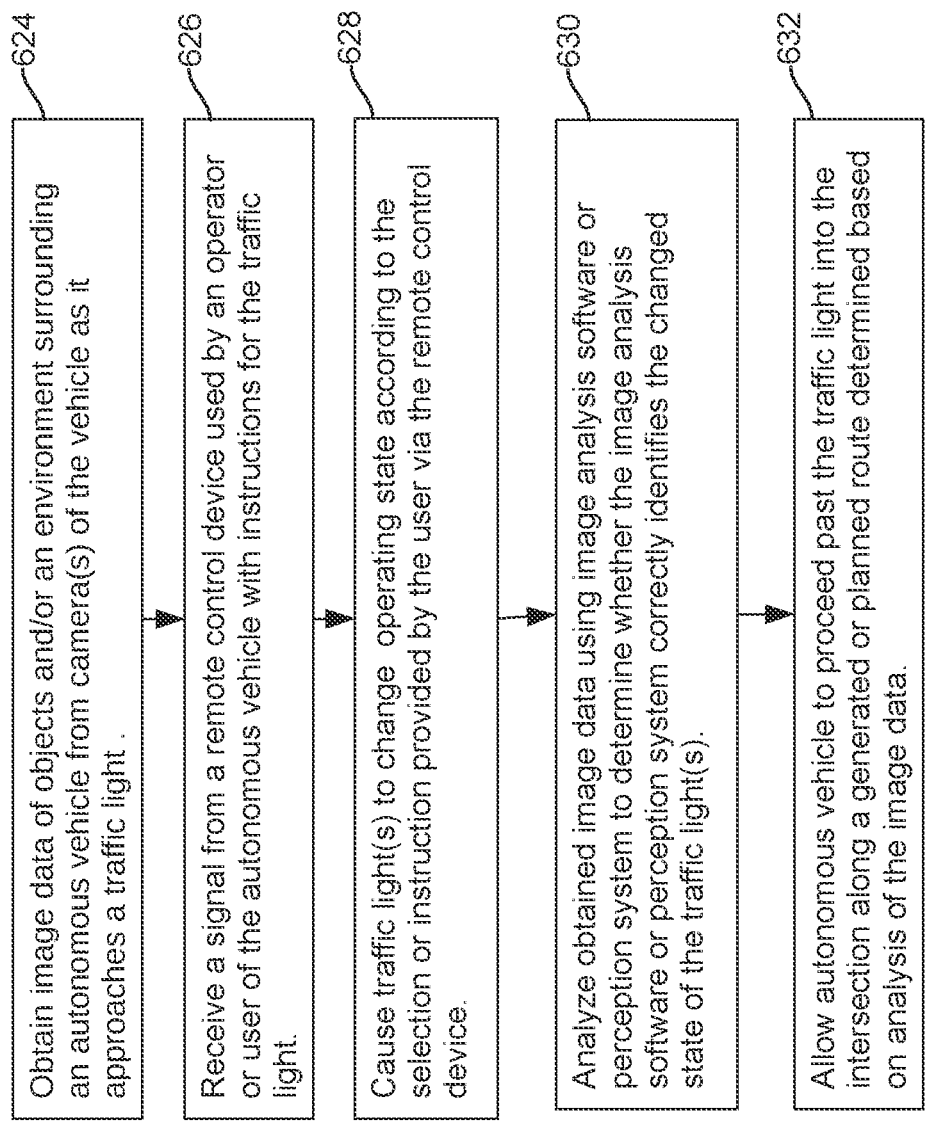

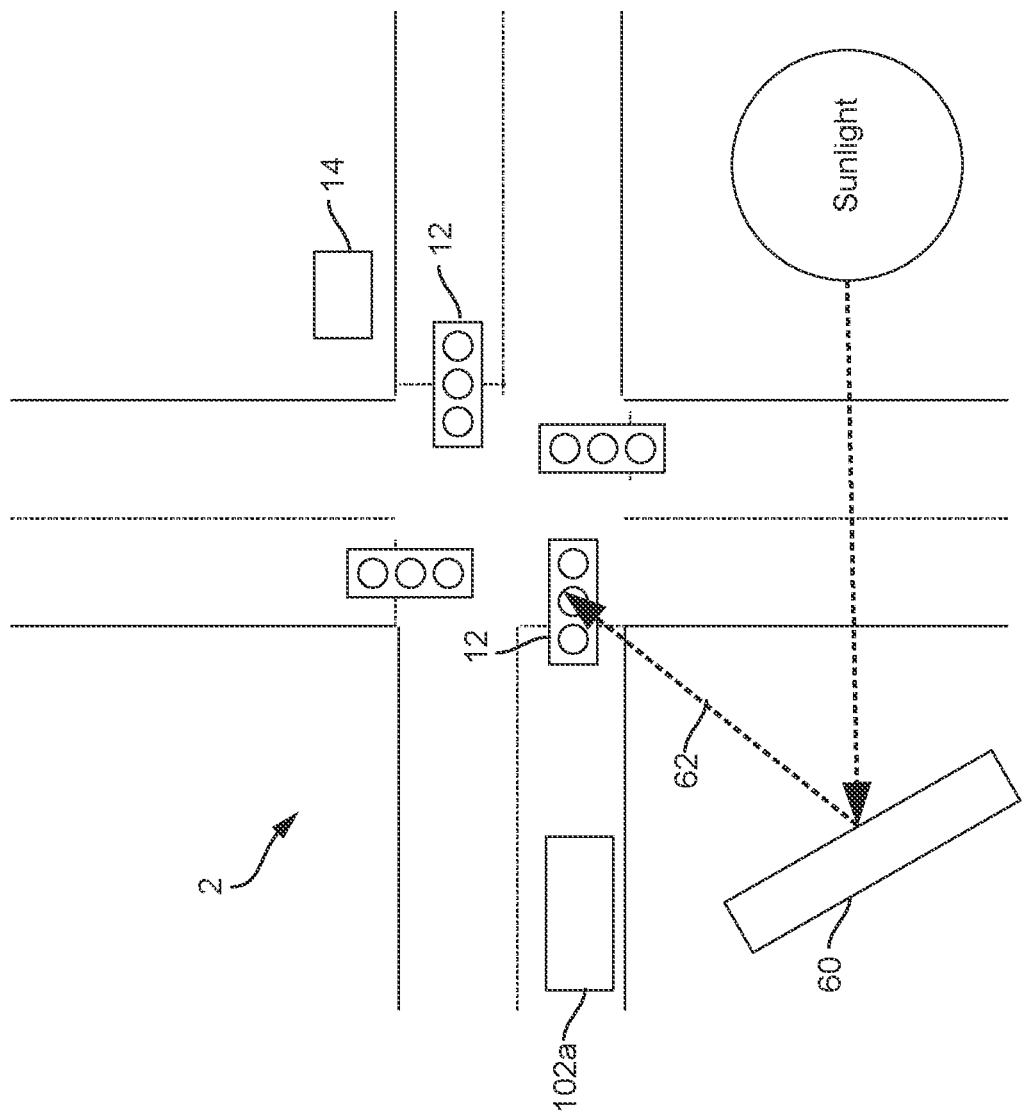

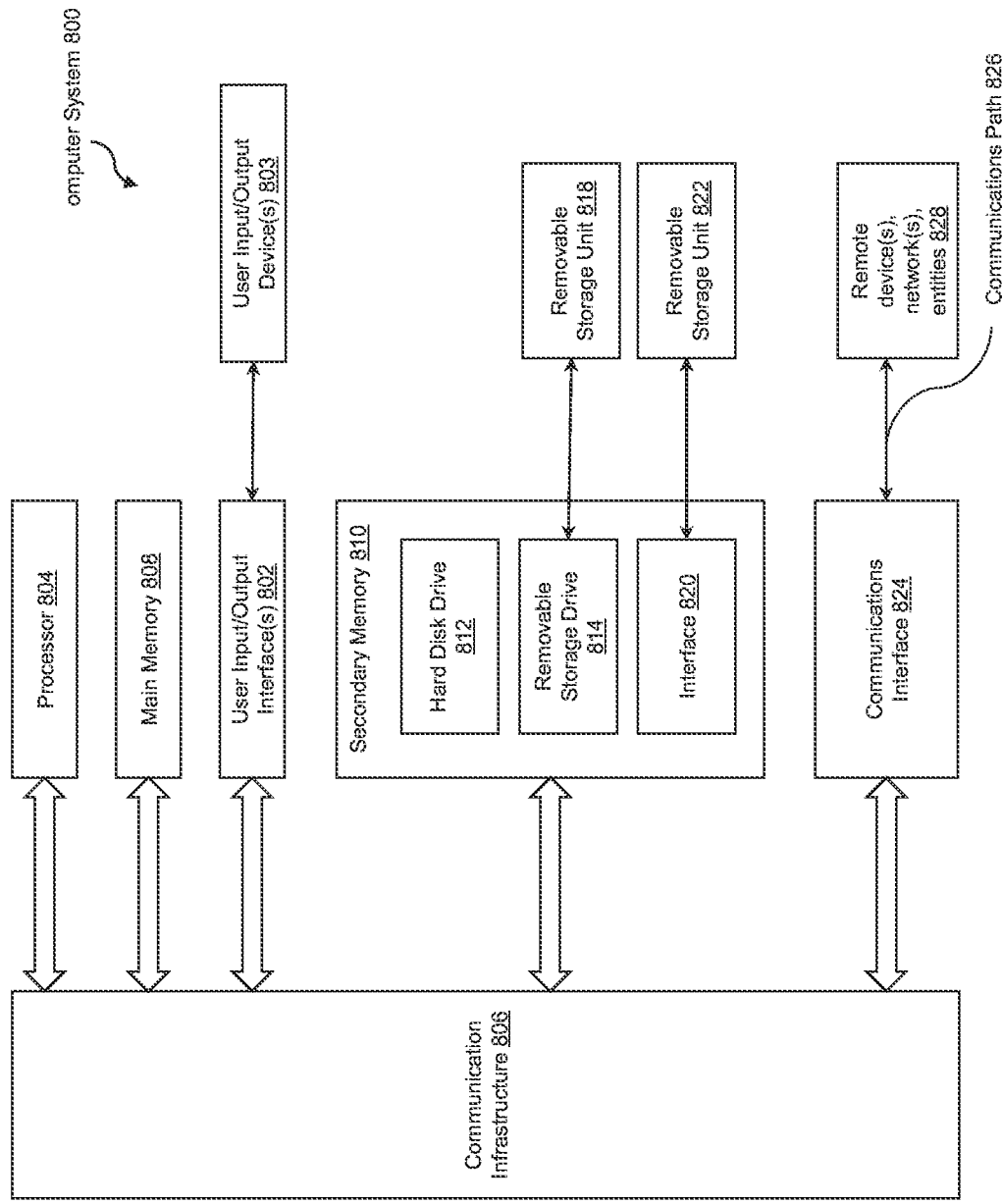

SYSTEMS AND METHODS FOR CONTROLLING A PROGRAMMABLE TRAFFIC LIGHT

FIELD

This disclosure relates generally to a controller for a signaling device, such as a traffic light, and, in particular, to a controller that changes a state of the signaling device during testing or use of an autonomous vehicle for testing image analysis software and/or a perception system of the autonomous vehicle. This disclosure also relates to methods of testing an autonomous vehicle that include exposing the autonomous vehicle to different standard and non-standard scenarios for the signaling device and analyzing a response of the autonomous vehicle to the different scenarios.

DESCRIPTION OF RELATED ART

Accurate and consistent obstacle detection and navigation can be key elements of autonomous driving applications. Typically, an autonomous vehicle utilizes various on-board sensors to detect obstacles, other aspects of the roadway, and/or other aspects of an environment around the vehicle, which can be referred to as "perception information" or "perception data" representing what an ordinary driver would perceive in the surrounding environment of a vehicle. Examples of such sensors include one or more of vision sensors (e.g., camera(s)), radio detection and ranging (e.g., radar) sensors, and/or light detection and ranging (e.g., LiDAR) sensors.

The perception information detected by the on-board sensors is processed and analyzed by image analysis software or a perception system to identify the objects surrounding the vehicle. The objects may include, for example, signaling devices, such as traffic lights, roadway boundaries, other vehicles, pedestrians, and/or obstacles. The perception system may also determine, for one or more identified objects in an environment, the current state of the object. The state information may include, for example, an object's current speed and/or acceleration, current orientation, size/footprint, type (e.g., vehicle vs. pedestrian vs. bicycle vs. static object or obstacle), and/or other state information. For a signaling device, such as a traffic light, the current state can include, for example, whether a red signal, a yellow signal, or a green signal of the traffic light is illuminated.

Perception systems known in the art apply different combinations of object recognition algorithms, video tracking algorithms, and computer vision algorithms (e.g., track objects frame-to-frame iteratively over a number of time periods) to determine the information about objects and/or to predict future location of objects from captured perception information and/or sensor data. In order to test or evaluate image analysis software and perception systems for vehicles, such as autonomous vehicles, for different cases or scenarios, there is a need to generate image datasets including cases or scenarios that emulate real-world conditions. Different analysis software and systems can be tested and evaluated based on their ability to correctly detect or identify objects in the different collected datasets that emulate the real-word conditions.

It can be especially important for autonomous vehicles that operate on public roads to correctly detect and determine a state of signaling devices, such as traffic lights. The autonomous vehicle should also determine an appropriate response, such as by planning and executing an appropriate path through an intersection, in response to a state of the signaling device determined by the autonomous vehicle software and perception systems. Further, the autonomous vehicle should be configured to identify times when a signaling device, such as a traffic light, is not operating correctly and take appropriate action. The devices, methods, and systems of the present disclosure are provided to assist in generating image datasets including images of the signaling device for use in testing and evaluating image analysis software and perception systems. The devices, methods, and systems disclosed herein are also provided to evaluate a response of the autonomous vehicle to different standard and non-standard scenarios or light sequences of a signaling device, such as a traffic light.

SUMMARY

According to an aspect of the present disclosure, a traffic light control system configured to provide instructions to at least one traffic light for testing performance of an autonomous vehicle as it approaches the at least one traffic light includes at least one controller. The controller includes a transceiver in communication with the at least one traffic light and computer-readable memory storing a plurality of operation routines for the at least one traffic light. The controller is configured to: select at least one operation routine of the plurality of operation routines on the computer-readable memory; and provide a control signal via the transceiver to the at least one traffic light to control operation of the at least one traffic light according to the selected at least one operation routine. Controlling operation of the traffic light includes turning on or off at least one of a plurality of light emitters of the at least one traffic light and/or changing a brightness, frequency, or intensity of at least one of the light emitters of the at least one traffic light.

According to another aspect of the present disclosure, a programmable traffic light for testing an autonomous vehicle includes: a housing; a first light signal viewable through a first opening in the housing illuminated by a first group of a plurality of light emitters of the traffic light; a second light signal viewable through a second opening in the housing illuminated by a second group of the plurality of light emitters of the traffic light; and a third light signal viewable through a third opening in the housing illuminated by a third group of the plurality of light emitters. The programmable traffic light further includes a transceiver positioned in the housing configured to receive instructions from a remote electronic device; and a controller positioned in the housing in communication with the transceiver and with the plurality of light emitters. The controller is configured to receive information from the remote electronic device via the transceiver and select at least one operation routine of a plurality of operation routines provided on computer-readable memory positioned in the housing in communication with the controller, wherein the selection is based on the information received from the remote electronic device. The controller is further configured to control operation of the plurality of light emitters according to the selected at least one operation routine. Controlling operation of the plurality of light emitters includes turning on or off at least one of a plurality of light emitters and/or changing a brightness, frequency, or intensity of at least one of the light emitters of the at least one traffic light.

According to another aspect of the disclosure, a method for testing or evaluating image analysis software or a perception system of an autonomous vehicle as the vehicle approaches at least one traffic light is provided. The image analysis software or perception system is configured to analyze images collected by at least one camera of the autonomous vehicle including images of the at least one traffic light. The method includes: obtaining image data of objects and/or an environment surrounding the vehicle from the at least one camera of the vehicle as the vehicle approaches the at least one traffic light; as the image data is being captured, manually or automatically changing an operating state of the at least one traffic light; and analyzing the obtained image data using the image analysis software or perception system for analysis of images collected by the at least one camera of the autonomous vehicle to determine whether the image analysis software or perception system correctly identifies the changed state of the at least one traffic light.

BRIEF DESCRIPTION OF THE DRAWINGS

Additional advantages and details are explained in greater detail below with reference to the exemplary embodiments that are illustrated in the accompanying schematic figures, in which:

FIG. 3A is a schematic drawing of an aerial view of an intersection including traffic lights and an autonomous vehicle, according to an aspect of the present disclosure;

FIG. 5A is a front view of a programmable traffic light, according to an aspect of the present disclosure;

FIG. 5B is a schematic drawing of electrical components of the programmable traffic light of FIG. 5A;

FIGS. 6A-6E are flow charts illustrating methods for testing or evaluating image analysis software that analyzes images of a signaling device, such as a traffic light, collected by camera(s) of an autonomous vehicle, according to an aspect of the present disclosure;

FIG. 7A is a drawing of an aerial view of an intersection including an autonomous vehicle, traffic lights, and a mirror for directing sunlight towards the traffic light, according to an aspect of the present disclosure;

FIG. 8 is a schematic drawing showing an exemplary computer system useful for implementing various examples and embodiments of the present disclosure.

DETAILED DESCRIPTION

Figure 1A:
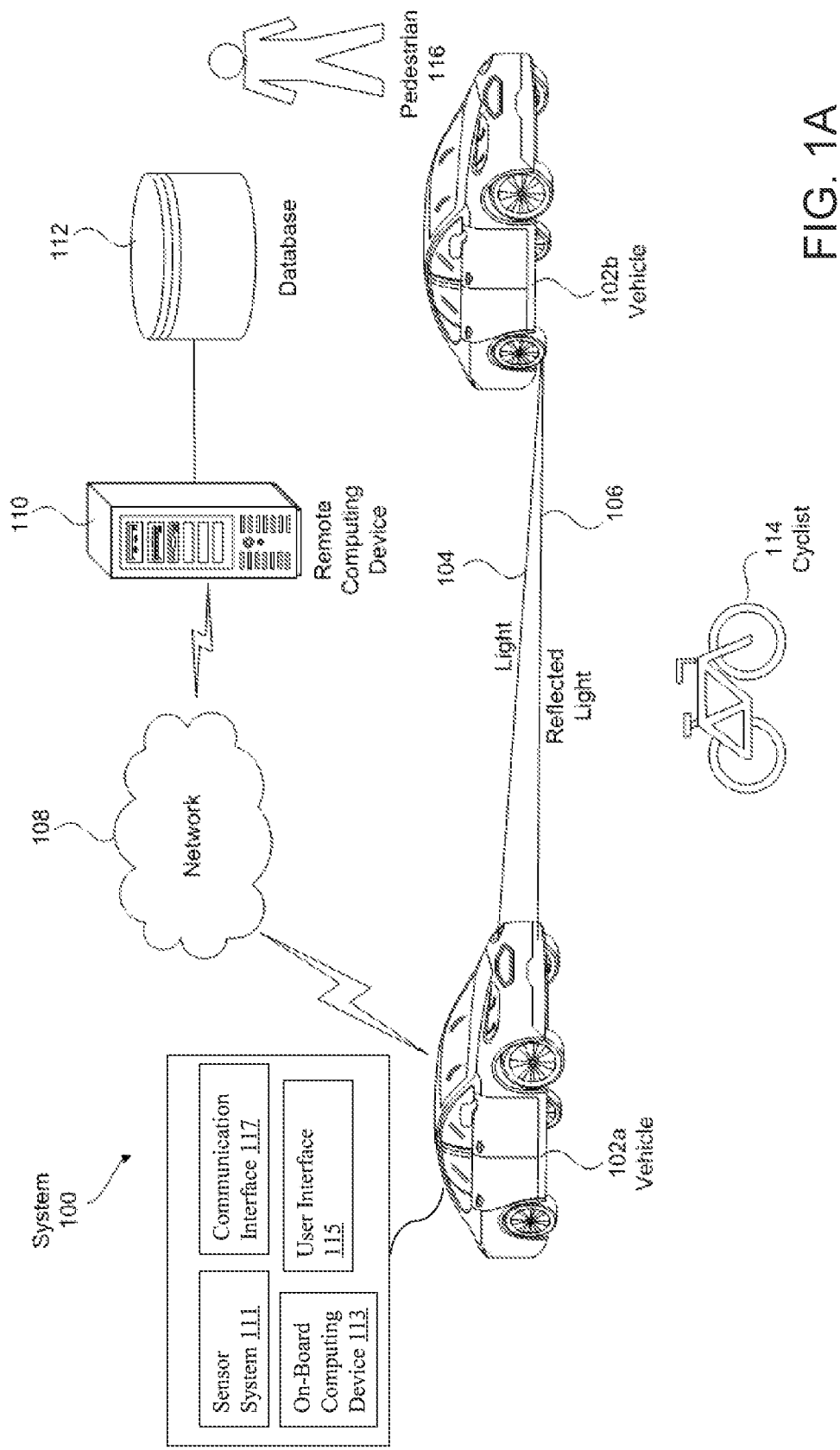
FIG. 1A is a schematic drawing of an exemplary autonomous vehicle system, according to an aspect of the present disclosure.

The following description is provided to enable those skilled in the art to make and use the described embodiments contemplated for carrying out the invention. Various modifications, equivalents, variations, and alternatives, however, will remain readily apparent to those skilled in the art. Any and all such modifications, variations, equivalents, and alternatives are intended to fall within the spirit and scope of the present invention.

For purposes of the description hereinafter, the terms "upper", "lower", "right", "left", "vertical", "horizontal", "top", "bottom", "lateral", "longitudinal", and derivatives thereof shall relate to the invention as it is oriented in the drawing figures. However, it is to be understood that the invention may assume alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

No aspect, component, element, structure, act, step, function, instruction, and/or the like used herein should be construed as critical or essential unless explicitly described as such. Also, as used herein, the articles "a" and "an" are intended to include one or more items, and may be used interchangeably with "one or more" and "at least one." As used herein, the terms "has," "have," "having," or the like are intended to be open-ended terms. Further, the phrase "based on" is intended to mean "based at least partially on" unless explicitly stated otherwise.

As used herein, the term "communication" may refer to the reception, receipt, transmission, transfer, provision, and/or the like, of data (e.g., information, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit processes information received from the first unit and communicates the processed information to the second unit.

Provided herein are systems, devices, and methods and/or combinations and sub-combinations thereof, for controlling a signaling device for use in testing and/or optimization of autonomous vehicles and autonomous vehicle control software. The system 10 of the present disclosure can be implemented, for example, at a test track or other controlled-access roadway for testing autonomous vehicles. For example, as described in further detail herein, various test intersections can be set up including different roadway configurations and arrangements of signaling devices. Autonomous vehicles can be driven through the different test intersections to evaluate whether the autonomous vehicles correctly identify and respond to the different signaling devices.

As using herein, a "signaling device" refers to a device that provides a visual indication instructing individuals (e.g., drivers, pedestrians, onlookers, bystanders, etc.) to perform a particular action and/or to move in a particular direction. The signaling device can be a traffic light (also referred to as a stoplight or traffic signal), such as a standard three aspect vertical traffic light, comprising a vertical arrangement of red, yellow, and green lights or signals. Signaling devices, such as traffic lights, are commonly positioned at road intersections, pedestrian crossings, and other locations for controlling a flow of traffic through the intersection and/or along the roadway. In other examples, the signaling device can be another type of visual indicator for controlling movement of a vehicle, such as a train crossing signal, electronic street or detour sign, overhead LED display, or any other sign or signal commonly found in proximity to a public or private roadway or parking lot.

Figure 1B:
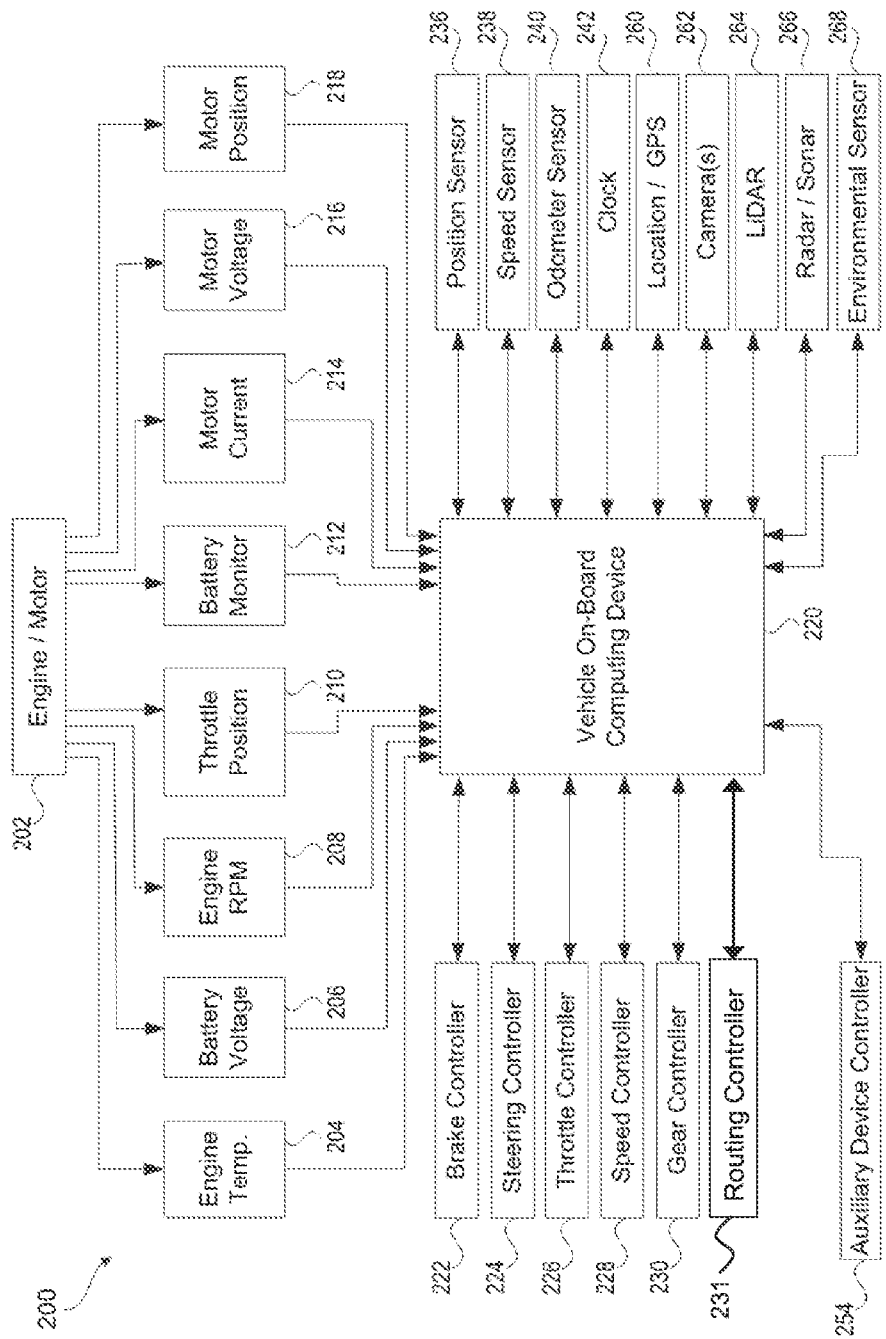
FIG. 1B is a schematic drawing illustrating exemplary system architecture for an autonomous vehicle, according to an aspect of the present disclosure.

As used herein, a "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, water-going vessels, boats, airplanes, helicopters, and/or aerial drones. An "autonomous vehicle" is a vehicle having a processor, programming instructions, and drivetrain components that are controllable by the processor without requiring a human operator. An autonomous vehicle may be "fully autonomous" in that it does not require a human operator for most or all driving conditions and functions, or it may be "semi-autonomous" in that a human operator may be required in certain conditions or for certain operations, or that a human operator may override the vehicle's autonomous system and may take control of the vehicle. An example of an autonomous vehicle 102a that can be used with the traffic light control systems 10, methods, and devices of the present disclosure is shown in FIGS. 1A and 1B. The systems and signalizing devices of the present disclosure are described herein as being used for testing of an autonomous vehicle 102a, such as an autonomous automobile. However, the systems, devices, and methods of the present disclosure are not limited to autonomous vehicle 102a applications. Instead, the systems, devices, and methods of the present disclosure may also be used in other applications, such as robotic applications, radar system applications, metric applications, and/or system performance applications.

In some examples, autonomous vehicles 102a can be configured to collect image data (also referred to as an image dataset) as the autonomous vehicle 102a approaches a traffic light 12 during both standard and non-standard traffic light scenarios. As used herein, a "standard traffic light scenario" refers to a scenario where, as the autonomous vehicle 102a approaches the traffic light 12, the traffic light 12 operates in an expected, conventional manner. For example, as the autonomous vehicle 102a approaches the traffic light 12, a green signal of the traffic light 12 may be illuminated. The traffic light 12 may change from the green signal to the yellow signal (e.g., the green signal may become dark and the yellow signal is illuminated) when the autonomous vehicle 102a is within a predetermined distance of the traffic light 12. Shortly after the yellow signal is illuminated, the red signal may be illuminated and the yellow signal becomes dark. The autonomous vehicle 102a is expected to brake when the traffic light 12 turns from green to yellow or to red. In another standard scenario, the red signal of the traffic light 12 is illuminated as the autonomous vehicle 102a approaches the traffic light 12. Before the autonomous vehicle 102a arrives at the intersection, the traffic light 12 changes from the red signal to the green signal (e.g., the red signal becomes dark and the green signal is illuminated). In this case, the autonomous vehicle 102a is expected to identify that the traffic light 12 changes to the green signal and should move through the intersection at a constant speed or may slightly accelerate through the intersection.

Non-standard traffic light scenarios can include scenarios in which signals illuminate at incorrect times (e.g., both the red signal and the green signal of the traffic light 12 illuminate at the same time) as well as scenarios where one or more signals of the traffic light 12 fail to illuminate as expected or required (e.g., all signals of the traffic light 12 are dark). Non-standard scenarios can also include instances when signals of the traffic light 12 illuminate at a correct time, but are difficult for a camera or vision sensor of an autonomous vehicle 102a to detect. For example, traffic lights 12 may illuminate at a correct time but may be too dim for the autonomous vehicle 102a camera or vision sensors to detect or the signals may flicker appearing to be dark in captured images of the traffic light 12. In other examples, obstructions on the autonomous vehicle camera (e.g., scratches, debris, or other objects proximate to the camera lens) or in proximity to the traffic light 12 may make it difficult for the vision sensor or camera of the vehicle 102a to obtain suitable images of the traffic light 12 for image analysis. For example, fog, smoke, dust, mist, rain, other expelled particles, debris, bright lights, and obstructions (e.g., tree branches or tall trucks) in proximity to the traffic light 12 may decrease visibility. Sunlight reflecting from a traffic light 12 or reflecting towards the camera or vision sensor of the autonomous vehicle 102a can also reduce image quality, making it difficult to determine which signals of the traffic light 12 are illuminated and which are dark. Non-standard scenarios can also include scenarios where traffic lights 12 move or swing, such that the same traffic light 12 appears to move between different positions in images of the traffic light 12 captured by the camera or vision sensor of the autonomous vehicle 102a.

The systems 10 and methods of the present disclosure are configured to process and analyze images of traffic lights 12 captured by the camera or vision sensor of the autonomous vehicle 102a during one or more of the standard or non-standard scenarios described herein. For example, captured sets of images can be processed using image analysis software to determine a position of the traffic light 12 in captured images and to identify the state of the traffic light (e.g., red, yellow, and/or green). Image analysis software that does not correctly detect the traffic light 12 or identify the state of the traffic light 12 in captured images may be modified or replaced to improve performance of the autonomous vehicle 102a. Beneficially, the systems 10 and methods disclosed herein allow users to quickly create image datasets for testing the autonomous vehicle 102a for a variety of scenarios that may occur as an autonomous vehicle 102a approaches a traffic light 12. Many of these scenarios would be difficult to reproduce during real-world driving simulations, especially because traffic lights 12 on public roadways rarely fail, meaning that many hours of real-world testing may be needed to evaluate the response of the autonomous vehicle 102a to certain non-standard scenarios.

In some examples, the systems 10 and methods disclosed herein allow an autonomous vehicle operator or another individual to directly control a traffic light 12 to test or observe a response of the autonomous vehicle 102a to scenarios selected by the operator or other individuals. For example, as described in further detail herein, the user or operator of the autonomous vehicle 102a may be provided with a remote control device for remotely controlling the traffic light 12. The user or operator may use the remote control to change the state of the traffic light 12 (e.g., causing the signal to turn from green to yellow to red) as the autonomous vehicle 102a approaches the traffic light 12. In other examples, the user or operator may use the remote control device to provide a non-standard scenario, such as by causing all signals of the traffic light 12 to illuminate simultaneously to evaluate how the autonomous vehicle 102a responds to the unusual or unexpected scenario.

In other examples, the system 10 can cause a traffic light 12 to automatically change state as the autonomous vehicle 102a approaches the intersection and/or the traffic light 12. For example, proximity sensors or detectors may be used to detect when the autonomous vehicle 102a approaches the traffic light 12. When the autonomous vehicle 102a is within a predetermined distance of the traffic light 12, the traffic light 12 can be configured to automatically change state (e.g., by changing from a green signal, to a yellow signal, to a red signal). In other examples, the traffic light 12 can be configured to perform a non-standard scenario or action when the autonomous vehicle 102a approaches the intersection or traffic light 12, such as causing all signals of the traffic light 12 to go dark simultaneously, to illuminate at the same time, or to illuminate according to a unique or unexpected pattern or sequence. Collected image data can be processed and analyzed by the autonomous vehicle software to determine a response of the autonomous vehicle 102a to the non-standard scenario.

Autonomous Vehicle System

FIG. 1A illustrates an exemplary autonomous vehicle system 100 that can be used with the traffic lights 12 and traffic light control systems 10 of the present disclosure. The system 100 comprises a vehicle (referred to herein as an autonomous vehicle 102a) that is traveling along a road in a semi-autonomous or autonomous manner. The autonomous vehicle 102a is generally configured to detect objects in proximity to the vehicle 102a. The objects can include, but are not limited to, another vehicle 102b, a cyclist 114 (such as a rider of a bicycle, electric scooter, motorcycle, or the like) and/or a pedestrian 116. As illustrated in FIG. 1A, the autonomous vehicle 102a may include a sensor system 111, an on-board computing device 113, a communications interface 117, and a user interface 115. The autonomous vehicle 102a may further include certain components (as illustrated, for example, in FIG. 1B) included in vehicles, which may be controlled by the on-board computing device 113 using a variety of communication signals and/or commands, such as, for example, acceleration signals or commands, deceleration signals or commands, steering signals or commands, and/or braking signals or commands.

The sensor system 111 may include one or more sensors that are coupled to and/or are included within the autonomous vehicle 102a, as illustrated in FIG. 1B. For example, such sensors may include, without limitation, a LiDAR system, a radio detection and ranging (RADAR) system, a laser detection and ranging (LADAR) system, a sound navigation and ranging (SONAR) system, one or more cameras or vision sensors (e.g., visible spectrum cameras, infrared cameras, etc.), temperature sensors, position sensors (e.g., global positioning system (GPS), etc.), location sensors, fuel sensors, motion sensors (e.g., inertial measurement units (IMU), etc.), humidity sensors, occupancy sensors, or the like. In some examples, the sensor system 111 can be configured to direct a laser beam or light beam 104 towards object(s) in proximity to the autonomous vehicle 102a and measure reflected light 106 reflected from the objects back towards the autonomous vehicle 102a, as shown in FIG. 1A. The sensor data can include information that describes the location of objects within the surrounding environment of the autonomous vehicle 102a, information about the environment itself, information about the motion of the autonomous vehicle 102a, information about a route of the autonomous vehicle 102, or the like. As autonomous vehicle 102a travels over a surface, such as a roadway, at least some of the sensors may collect data pertaining to the surface. It should be noted that the LiDAR systems for collecting data pertaining to the surface may be included in systems other than the autonomous vehicle 102a such as, without limitation, other vehicles (autonomous or driven), robots, satellites, etc.

A network 108 for communication with the autonomous vehicle 102a can include one or more wired or wireless networks. For example, the network 108 may include a cellular network (e.g., a long-term evolution (LTE) network, a code division multiple access (CDMA) network, a 3G network, a 4G network, a 5G network, another type of next generation network, etc.). The network 108 may also include a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

The autonomous vehicle 102a may retrieve, receive, display, and edit information generated from a local application or delivered via network 108 from database 112. A database 112 may be configured to store and supply raw data, indexed data, structured data, map data, program instructions, or other configurations as is known.

The communications interface 117 may be configured to allow communication between the autonomous vehicle 102a and external systems, such as, for example, external devices, sensors, other vehicles, servers, data stores, and/or databases. The communications interface 117 may utilize any known or hereafter known protocols, protection schemes, encodings, formats, packaging, etc., such as, without limitation, Wi-Fi, an infrared link, Bluetooth®, etc. The user interface system 115 may be part of peripheral devices implemented within the autonomous vehicle 102a including, for example, a keyboard, a touch screen display device, a microphone, and/or a speaker.

Autonomous Vehicle System Architecture

FIG. 1B illustrates an exemplary system architecture 200 for the autonomous vehicle 102a, in accordance with aspects of the present disclosure. It is understood, however, that other types of vehicles are considered within the scope of the technology described herein and may contain more or less elements as described in association with FIG. 1B. As a non-limiting example, an airborne vehicle may exclude brake or gear controllers, but may include an altitude sensor. In another non-limiting example, a water-based vehicle may include a depth sensor. One skilled in the art will appreciate that other propulsion systems, sensors, and controllers may be included based on a type of vehicle, as is known.

As shown in FIG. 1B, the vehicle system architecture 200 comprises an engine or motor 202 and various sensors 204-218 for measuring various parameters of the vehicle. In gas-powered or hybrid vehicles having a fuel-powered engine, the sensors may include, for example, an engine temperature sensor 204, a battery voltage sensor 206, an engine Rotations Per Minute ("RPM") sensor 208, and a throttle position sensor 210. If the vehicle is an electric or hybrid vehicle, then the vehicle may have an electric motor, and accordingly includes sensors, such as a battery monitoring system 212 (to measure current, voltage, and/or temperature of the battery), motor current 214 and voltage 216 sensors, and motor position sensors 218, such as resolvers and encoders.

Operational parameter sensors that are common to both types of vehicles include, for example: a position sensor 236, such as an accelerometer, gyroscope and/or inertial measurement unit; a speed sensor 238; and an odometer sensor 240. The vehicle also may have a clock 242 that the system uses to determine vehicle time during operation. The clock 242 may be encoded into the vehicle on-board computing device 113, it may be a separate device, or multiple clocks may be available.

The vehicle also includes various sensors that operate to gather information about the environment in which the vehicle is traveling. These sensors may include, for example: a location sensor 260 (e.g., a Global Positioning System ("GPS") device); object detection sensors such as one or more vision sensors or cameras 262; a lidar system 264; and/or a radar and/or a sonar system 266. The sensors also may include environmental sensors 268, such as a precipitation sensor and/or ambient temperature sensor. The object detection sensors may enable the vehicle to detect objects that are within a given distance range of the vehicle 200 in any direction, while the environmental sensors 268 collect data about environmental conditions within the vehicle's area of travel.

During operations, information is communicated from the sensors to a vehicle on-board computing device 220. The on-board computing device 220 may be implemented using a computer system, such as the computer system 800 illustrated in FIG. 8. The vehicle on-board computing device 220 analyzes the data captured by the sensors and optionally controls operations of the vehicle 200 based on results of the analysis. For example, the vehicle on-board computing device 220 may control: braking via a brake controller 222; direction via a steering controller 224; speed and acceleration via a throttle controller 226 (in a gas-powered vehicle) or a motor speed controller 228 (such as a current level controller in an electric vehicle); a differential gear controller 230 (in vehicles with transmissions); and/or other controllers. Auxiliary device controller 254 may be configured to control one or more auxiliary devices, such as testing systems, auxiliary sensors, or mobile devices transported by the vehicle 200.

Geographic location information may be communicated from the location sensor 260 to the on-board computing device 220, which may then access a map of the environment that corresponds to the location information to determine known fixed features of the environment, such as streets, buildings, stop signs, and/or stop/go signals. Captured images from the cameras 262 and/or object detection information captured from sensors such as lidar system 264 is communicated from those sensors to the on-board computing device 220. The object detection information and/or captured images are processed by the on-board computing device 220 to detect objects in proximity to the vehicle 200. Any known or to be known technique for making an object detection based on sensor data and/or captured images can be used in the embodiments disclosed in this document.

Lidar information is communicated from lidar system 264 to the on-board computing device 220. Additionally, captured images are communicated from the camera(s) 262 to the vehicle on-board computing device 220. The lidar information and/or captured images are processed by the vehicle on-board computing device 220 to detect objects in proximity to the vehicle 200. The manner in which the object detections are made by the vehicle on-board computing device 220 includes such capabilities detailed in this disclosure.

The on-board computing device 220 may include and/or may be in communication with a routing controller 231 that generates a navigation route from a start position to a destination position for an autonomous vehicle 102a. The routing controller 231 may access a map data store to identify possible routes and road segments that a vehicle can travel on to get from the start position to the destination position. The routing controller 231 may score the possible routes and identify a preferred route to reach the destination. For example, the routing controller 231 may generate a navigation route that minimizes Euclidean distance traveled or other cost function during the route, and may further access the traffic information and/or estimates that can affect an amount of time it will take to travel on a particular route. Depending on implementation, the routing controller 231 may generate one or more routes using various routing methods, such as Dijkstra's algorithm, Bellman-Ford algorithm, or other algorithms. The routing controller 231 may also use the traffic information to generate a navigation route that reflects expected conditions of the route (e.g., current day of the week or current time of day, etc.), such that a route generated for travel during rush-hour may differ from a route generated for travel late at night. The routing controller 231 may also generate more than one navigation route to a destination and send more than one of these navigation routes to a user for selection by the user from among various possible routes.

In various examples, the on-board computing device 220 may determine perception information of the surrounding environment of the autonomous vehicle 102a. Based on the sensor data provided by one or more sensors and location information that is obtained, the on-board computing device 220 may determine perception information of the surrounding environment of the autonomous vehicle 102a. The perception information may represent what an ordinary driver would perceive in the surrounding environment of a vehicle 200. The perception data may include information relating to one or more objects in the environment of the autonomous vehicle 102a. For example, the on-board computing device 220 may process sensor data (e.g., LiDAR or RADAR data, camera images, etc.) in order to identify objects and/or features in the environment of the autonomous vehicle 102a. The objects may include traffic signals, road way boundaries, other vehicles, pedestrians, and/or obstacles, etc. The on-board computing device 220 may use any known or hereafter known object recognition algorithms, video tracking algorithms, and computer vision algorithms (e.g., track objects frame-to-frame iteratively over a number of time periods) to determine the perception.

In some examples, the on-board computing device 220 may also determine, for one or more identified objects in the environment, the current state of the object. The state information may include, without limitation, for each object: current location; current speed and/or acceleration, current heading; current pose; current shape, size, or footprint; type (e.g., vehicle vs. pedestrian vs. bicycle vs. static object or obstacle); and/or other state information.

The on-board computing device 220 may perform one or more prediction and/or forecasting operations. For example, the on-board computing device 220 may predict future locations, trajectories, and/or actions of one or more objects. For example, the on-board computing device 220 may predict the future locations, trajectories, and/or actions of the objects based at least in part on perception information (e.g., the state data for each object comprising an estimated shape and pose determined as discussed below), location information, sensor data, and/or any other data that describes the past and/or current state of the objects, the autonomous vehicle 102a, the surrounding environment, and/or their relationship(s). For example, if an object is a vehicle and the current driving environment includes an intersection, the on-board computing device 220 may predict whether the object will likely move straight forward or make a turn. If the perception data indicates that the intersection has no traffic light, the on-board computing device 220 may also predict whether the vehicle may have to fully stop prior to enter the intersection.

In various embodiments, the on-board computing device 220 may determine a motion plan for the autonomous vehicle 102a. For example, the on-board computing device 220 may determine a motion plan for the autonomous vehicle 102a based on the perception data and/or the prediction data. Specifically, given predictions about the future locations of proximate objects and other perception data, the on-board computing device 220 can determine a motion plan for the autonomous vehicle 102a that best navigates the autonomous vehicle 102a relative to the objects at their future locations.

In some examples, the on-board computing device 220 may receive predictions and make a decision regarding how to handle objects and/or actors in the environment of the autonomous vehicle 102a. For example, for a particular actor (e.g., a vehicle with a given speed, direction, turning angle, etc.), the on-board computing device 220 decides whether to overtake, yield, stop, and/or pass based on, for example, traffic conditions, map data, state of the autonomous vehicle, etc. Furthermore, the on-board computing device 220 also plans a path for the autonomous vehicle 102a to travel on a given route, as well as driving parameters (e.g., distance, speed, and/or turning angle). That is, for a given object, the on-board computing device 220 decides what to do with the object and determines how to do it. For example, for a given object, the on-board computing device 220 may decide to pass the object and may determine whether to pass on the left side or right side of the object (including motion parameters such as speed). The on-board computing device 220 may also assess the risk of a collision between a detected object and the autonomous vehicle 102a. If the risk exceeds an acceptable threshold, it may determine whether the collision can be avoided if the autonomous vehicle 102a follows a defined vehicle trajectory and/or implements one or more dynamically generated emergency maneuvers performed in a pre-defined time period (e.g., N milliseconds). If the collision can be avoided, then the on-board computing device 220 may execute one or more control instructions to perform a cautious maneuver (e.g., mildly slow down, accelerate, change lane, or swerve). In contrast, if the collision cannot be avoided, then the on-board computing device 220 may execute one or more control instructions for execution of an emergency maneuver (e.g., brake and/or change direction of travel).

As discussed above, planning and control data regarding the movement of the autonomous vehicle 102a is generated for execution. The on-board computing device 220 may, for example, control braking via a brake controller 222; direction via a steering controller 224; speed and acceleration via a throttle controller 226 (in a gas-powered vehicle) or a motor speed controller 228 (such as a current level controller in an electric vehicle); a differential gear controller 230 (in vehicles with transmissions); and/or other controllers.

Traffic Light Control System

Figure 2A:
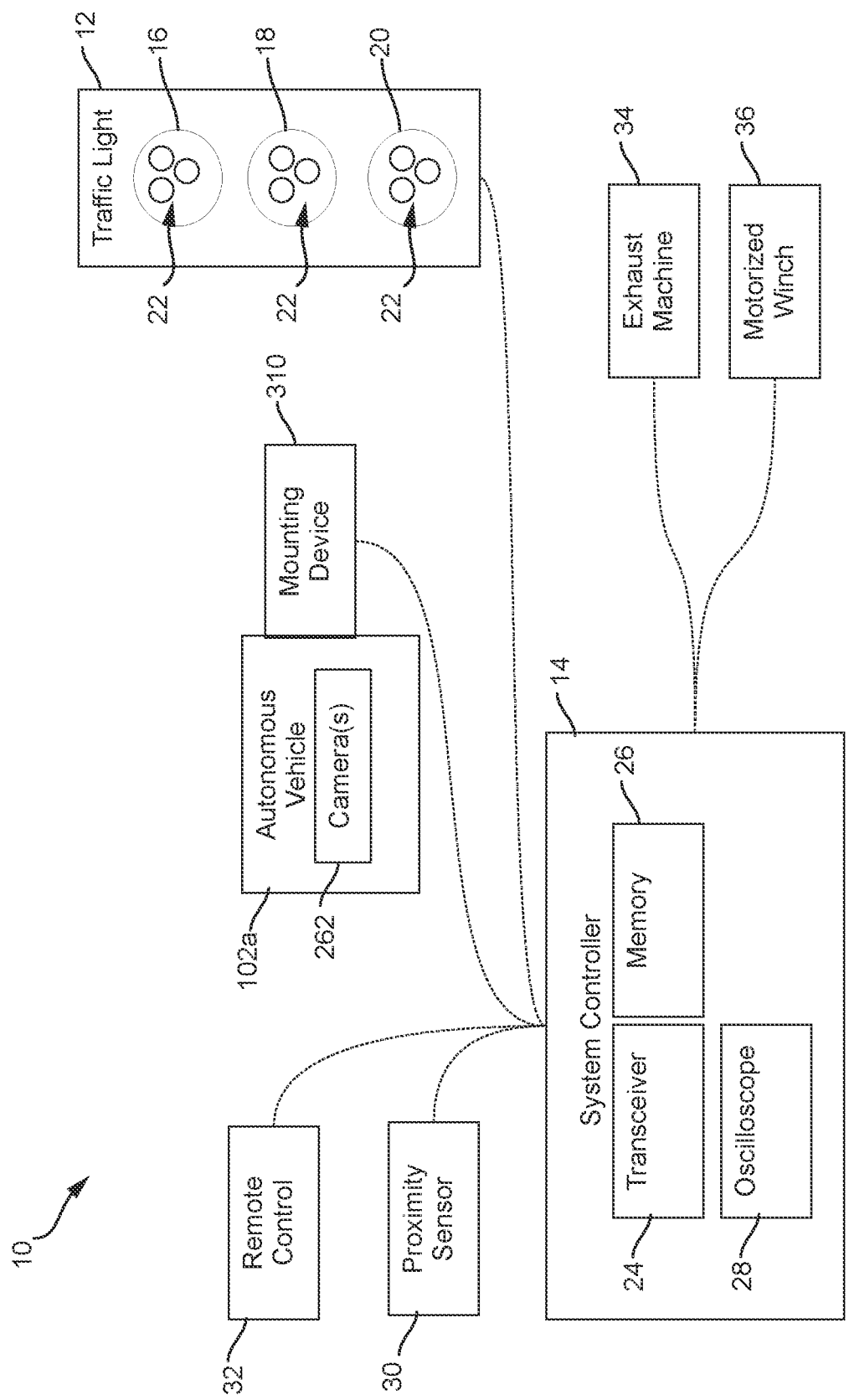
FIG. 2A is a schematic drawing of a control system for a signaling device, such as a traffic light, according to an aspect of the present disclosure.
Figure 2B:
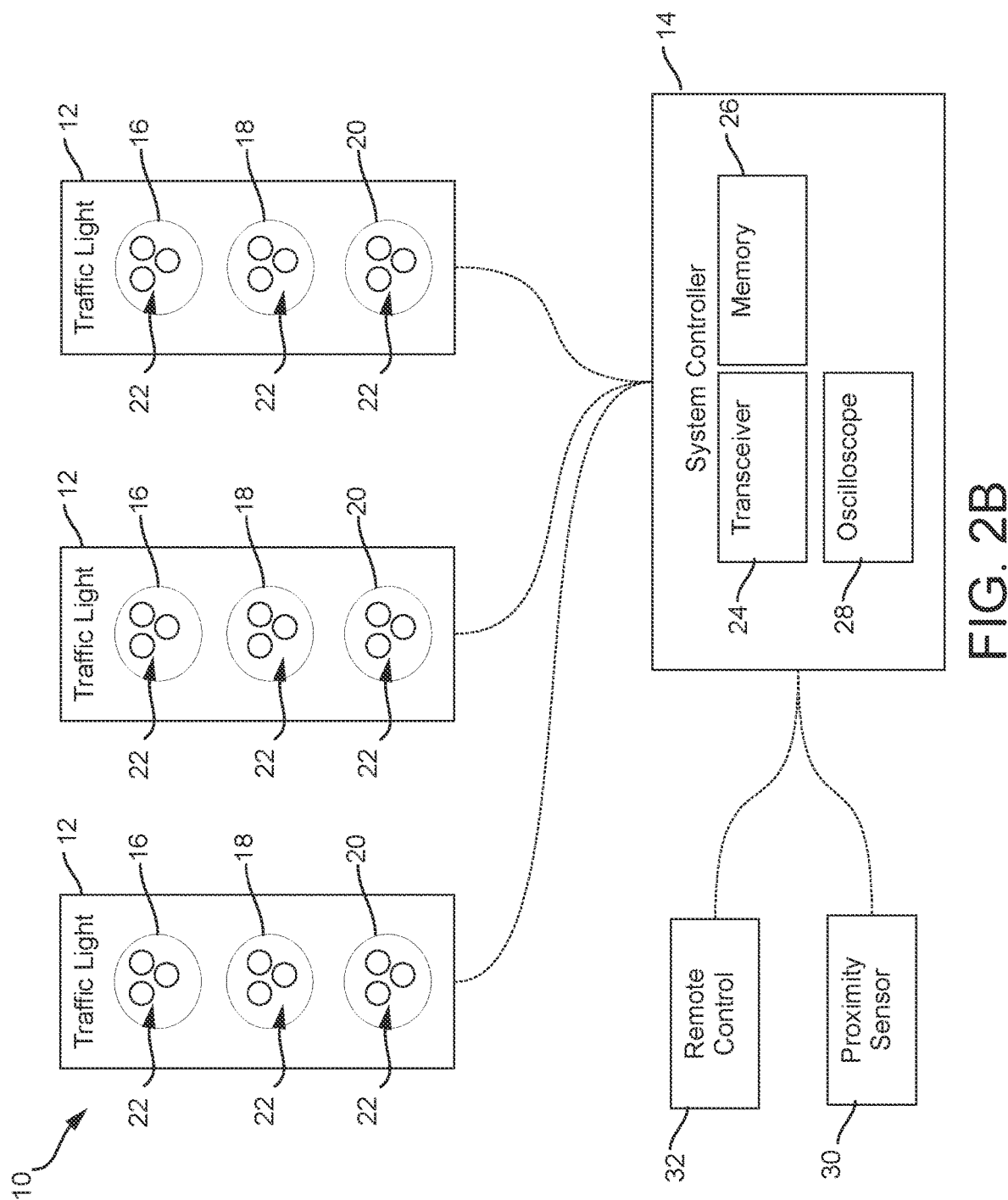
FIG. 2B is a schematic drawing of a control system for controlling multiple signaling devices, such as multiple traffic lights at an intersection, according to an aspect of the present disclosure.
Figure 3B:
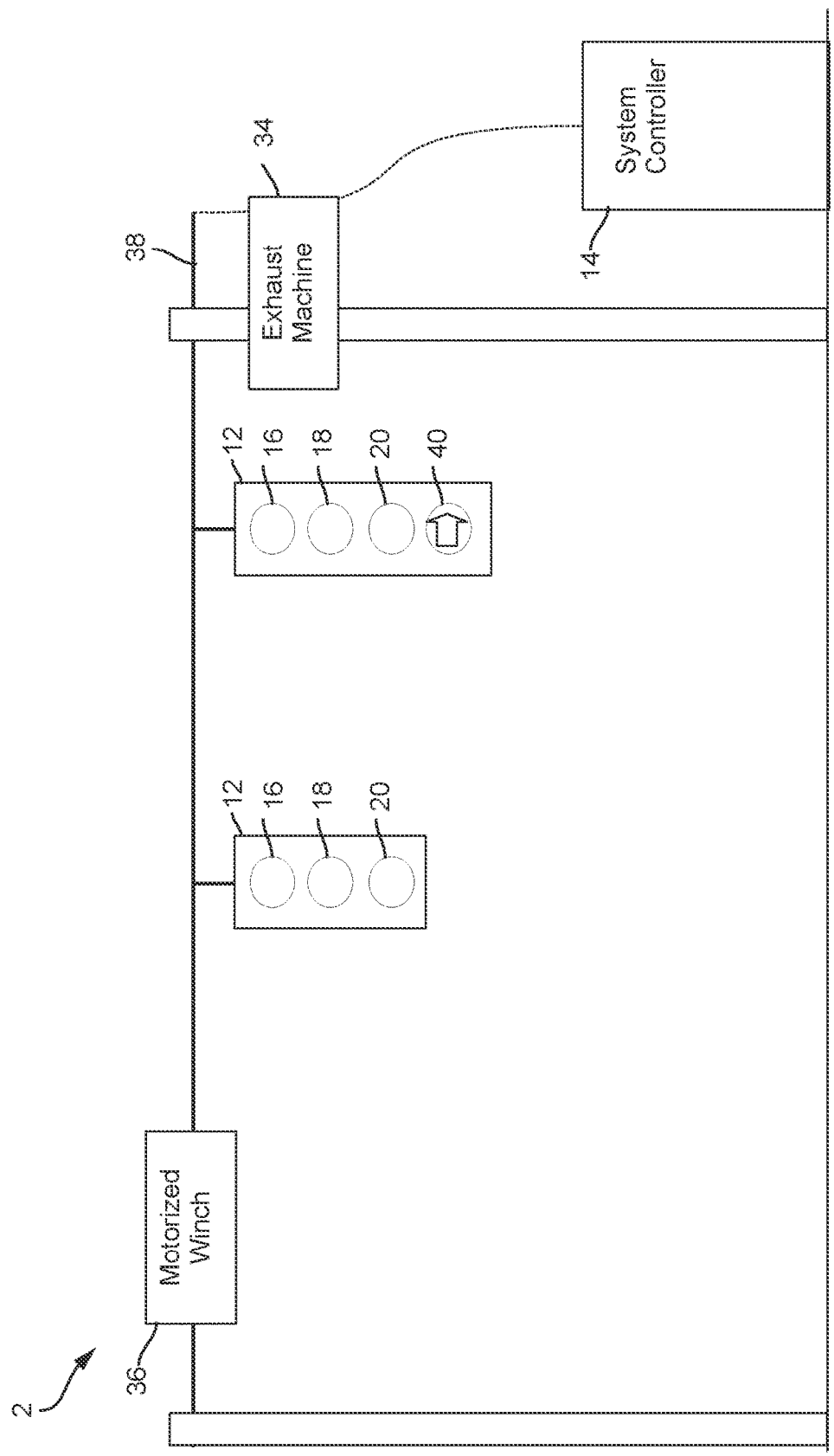
FIG. 3B is a schematic drawing of a street-level view of the intersection and traffic lights of FIG. 3A.
Figure 3C:
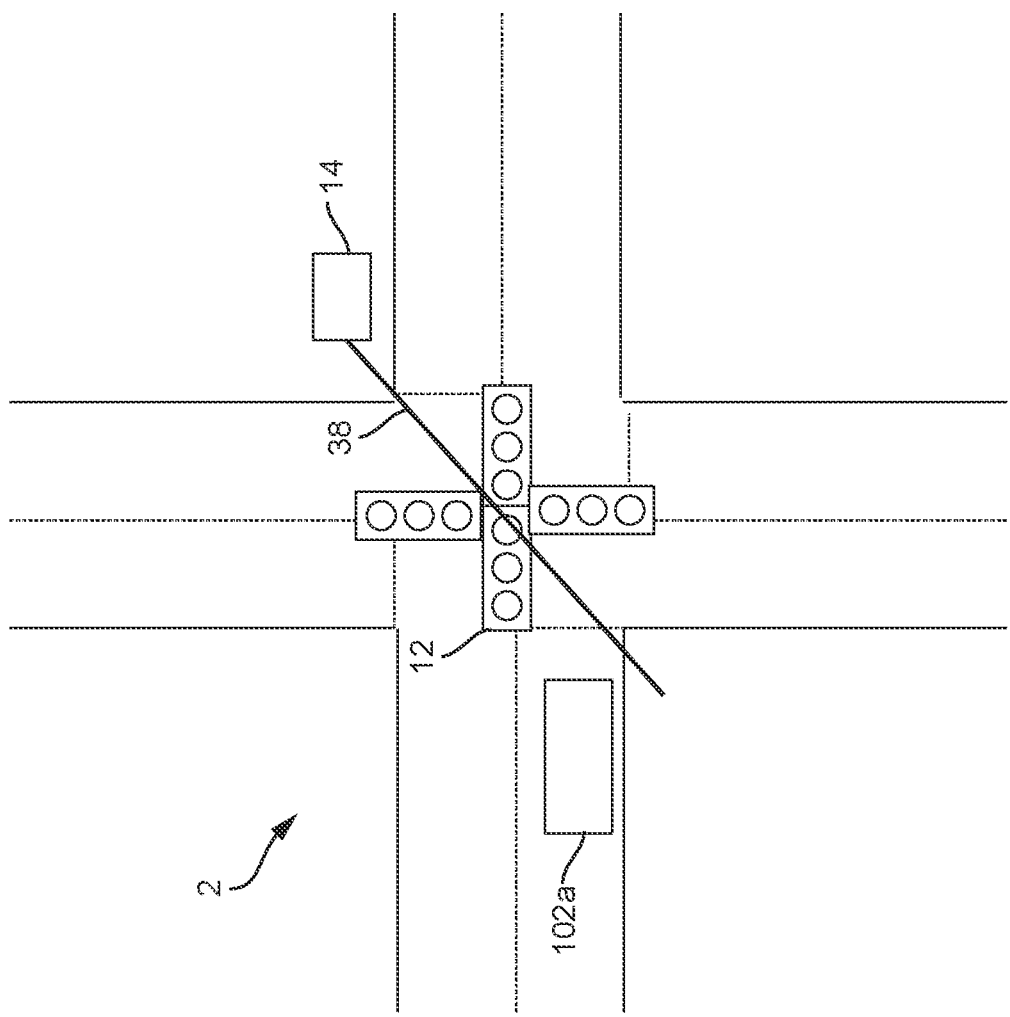
FIG. 3C is a schematic drawing of an aerial view of another exemplary intersection, according to an aspect of the present disclosure.

FIGS. 2A and 2B illustrate a traffic light control system 10 configured to provide instructions to a single traffic light 12 (shown in FIG. 2A) or to multiple traffic lights 12 (shown in FIG. 2B) for testing performance of an autonomous vehicle 102a as it approaches traffic light(s) 12 in an intersection 2 (shown in FIGS. 3A-3C) or elsewhere along a public roadway. FIGS. 3A-3C are schematic drawings showing examples of different intersections 2 including the traffic light(s) 12. Specifically, FIG. 3A is an aerial view of an intersection 2 formed between two multi-lane roads and including eight traffic lights 12 (e.g., two traffic lights 12 facing in each direction). FIG. 3B is a street level view of the intersection 2 of FIG. 3A showing the traffic lights 12. FIG. 3C is an aerial view of another exemplary intersection 2 formed between single lane roads. The intersection 2 includes four traffic lights positioned in a center of the intersection. As previously described, these exemplary intersections 2 can be created at test tracks or other limited access roadways to test the autonomous vehicle 102a. Specifically, the traffic light control systems 10 of the present disclosure allows users to manually or automatically control one or more of the traffic lights 12 of the intersections 2 as the autonomous vehicle 102a approaches the intersection 2 to evaluate how the autonomous vehicle 102a responds to different standard and non-standard scenarios.

With reference to FIGS. 2A and 2B, the traffic light control system 10 comprises a system controller 14 that provides operating instructions to the traffic light(s) 12. The traffic light(s) 12 can be standard traffic lights, such as a vertical light comprising a red signal 16, a yellow signal 18, and a green signal 20 arranged vertically. In some examples, the traffic light 12 comprises multiple light emitters 22, such as incandescent bulbs, halogen bulbs, or light emitting diodes (LEDs), positioned to illuminate the different signals 16, 18, 20. In many cases, the traffic light 12 can include multiple light emitters 22 for each signal 16, 18, 20, so that the signal continues to operate even if one or a few of the light emitters 22 fails. For example, the traffic light 12 can include a first group of light emitters 22 that, when illuminated, produce the red signal 16; a second group of light emitters 22 that, when illuminated, produce the amber or yellow signal 18; and a third group of light emitters 22 that, when illuminated, produce the green signal 20.

The system controller 14 can be a dedicated electronic device, such as a device comprising computer processors and other electronic circuitry for providing operating instructions to traffic lights 12, positioned proximate to a roadway and/or intersection. For example, the dedicated electronic device can comprise and/or can be contained within a box or housing positioned on the ground proximate to the roadway or intersection, as shown in FIGS. 3A-3C, and can be connected to the traffic light(s) 12 by, for example, overhead cables 38 (shown in FIGS. 3B and 3C). In other examples, the system controller 14 can be a general-purpose computer device, such as a laptop computer, smart phone, tablet, or any other computer device electrically coupled and/or in communication with the traffic light(s) 12 and other electronic devices of the system 10. In some examples, the system controller 14 includes features of the computer system 800 illustrated in FIG. 8.

In some examples, the system controller 14 comprises a communication device, transceiver 24, or another data transmitting device for communicating operating instructions from the system controller 14 to the traffic light(s) 12. As used herein, a "transceiver" refers to electronic circuitry and/or electronic devices configured to transmit and/or receive electronic data. The transceiver 24 can be a wired communication device and/or a wireless device. For example, a wireless transceiver 24 can use Bluetooth®, Wifi, a cellular network, near-field communication devices, or any other wireless data transmission device or system for communication between the system controller 14 and traffic light(s) 12.

The system controller 14 can also include computer-readable memory 26 that contains or comprises predetermined operation modes or operation routines that can be implemented for the traffic light(s) 12. The system controller 14 can be configured to select and implement a particular operation mode or routine for the traffic light(s) 12 based, for example, on inputs provided by system users (e.g., a driver, rider, passenger, or operator of the autonomous vehicle 102a) or based on information sensed or detected by other electronic devices of the system 10. In order to implement a particular operation routine for the traffic light(s) 12, the system controller 14 can be configured to first select an operation routine for the traffic light 12 from operation routines stored on the computer-readable memory 26 associated with the controller 14. The system controller 14 can then be configured to provide a control signal via the transceiver 24 to the traffic light(s) 12 to control operation of the traffic light(s) 12 according to the selected operation mode or routine. As described in further detail herein, operation modes or routines provided by the system 10 can include, for example, routines involving turning on or off light emitters 22 of the traffic light(s) 12 at specific times and/or according to certain predetermined light sequences. In one exemplary operation routine, as the autonomous vehicle 102a approaches the traffic light 12, the system controller 14 can be configured to cause the traffic light 12 to illuminate the green signal 20 for a period of time (e.g., from about 10 seconds to 15 seconds or longer), followed by illuminating the amber or yellow signal 18 for a shorter period of time (e.g., for about 2 seconds), followed by illuminating the red signal 16 for an indeterminate time. The camera(s) 262 of the autonomous vehicle 102a can be configured to obtain images of the traffic light 12 as the autonomous vehicle 102a approaches the traffic light 12 and can detect when the traffic light 12 changes between states (e.g., changing from green to yellow to red).

In other examples, an operating routine for the traffic light(s) 12 can include changing a brightness, frequency, or intensity of one or more of the light emitters 22 of the traffic light(s) 12. For example, the operation routine implemented by the system controller 14 can reduce brightness of one or more of the light emitters 22 to approximate lighting conditions when a traffic light 12 is malfunctioning or partially obscured from view. In particular, a selected operation routine can include an instruction that reduces brightness of the light emitters 22 to a brightness of less than 100%, less than 50%, or, preferably, less than 15% of the maximum brightness of the light emitter 22 in order to approximate a real-world appearance for certain traffic light signals 16, 18, 20. Image datasets including the reduced brightness signals 16, 18, 20 can be analyzed by the autonomous vehicle software to determine whether the software correctly detects the traffic light 12 and identifies a state of the traffic light(s) 12 despite the reduced brightness.

In other examples, a selected operation routine can include an instruction to adjust the frequency of light emitters 22 of the traffic light(s) 12 to determine whether the autonomous vehicle software correctly identifies when the light emitter 22 and signals 16, 18, 20 flicker. Many light emitters 22 of traffic lights 12 may flicker when illuminating a signal 16, 18, 20 of the traffic light 12. In most cases, the flickering is fast enough that it is not perceptible to bystanders or drivers to whom the light of the signal 16, 18, 20 appears to be substantially constant. However, in images captured by high speed cameras, such as the camera(s) 262 of the autonomous vehicle 102a, the signal 16, 18, 20 may appear to be dark when flickering. In order to confirm that the autonomous vehicle software can account for such flickering, image data can be collected for the traffic light 12 for light emitters 22 that flicker at different frequencies. The image data can be analyzed to confirm that the software correctly distinguishes between an illuminated flickering signal 16, 18, 20 and a dark signal 16, 18, 20. For example, as shown in FIGS. 2A and 2B, the system 10 can include an oscilloscope 28 for generating a signal that causes the light emitters 22 to flicker at the selected frequency. The oscilloscope 28 can be electrically connected to the system controller 14 and configured to receive instructions from the system controller 14 for generating the frequency signal. For example, the system controller 14 may cause the oscilloscope 28 to output a signal that causes light emitters 22 of the traffic light(s) 12 to flicker at a frequency of about 50 hz to about 100 hz and at a duty cycle of about 50%.

With continued reference to FIGS. 2A and 2B, in some examples, the system 10 further comprises a proximity sensor 30 in electrical communication with the system controller 14 that is configured to detect a distance between the autonomous vehicle 102a and one or more of the traffic light(s) 12. In some examples, the proximity sensor 30 can be a range finder device, such as a laser range finder, mounted to one of the traffic lights 12 or to another device or structure at the intersection. The laser range finder can be configured to project a laser towards a roadway to detect the autonomous vehicle 102a as it approaches the traffic light 12. In other examples, the proximity sensor 30 can be a radio frequency sensor, such as a near field communication sensor or device, configured to detect radio frequency signals emitted by the autonomous vehicle 102a as the autonomous vehicle 102a approaches the traffic light 12. In other examples, information from location determination circuitry, such as a global positioning system (GPS) device of the autonomous vehicle 102a, can be used to determine a distance between the autonomous vehicle 102a and the traffic light 12.

In some examples, as the autonomous vehicle 102a approaches the intersection and/or traffic light 12, the proximity sensor 30 monitors a distance between the vehicle 102a and the traffic light 12. When the distance detected by the proximity sensor 30 is less than a predetermined distance, such as from about 20 meters to about 40 meters from the traffic light 12, the system controller 14 can be configured to automatically provide the control signal to the traffic light 12 for controlling operation of the traffic light 12. As previously described, in a "standard scenario," the control signal can cause light emitters 22 of a green signal 20 to turn off and light emitters 22 of another signal (e.g., the yellow/amber signal 18 or the red signal 16) to turn on to illuminate the yellow or red signal 16, 18. The autonomous vehicle 102a is expected to detect the change in state of the traffic light 12 and perform an appropriate operation, such as reducing speed and/or braking in response to the yellow/amber signal 18 or the red signal 16.

With continued reference to FIGS. 2A and 2B, in some examples, the system 10 further comprises a remote control 32 in electronic communication with the system controller 14 that allows a user to manually control the traffic light 12. For example, the remote control 32 may be a fob or similar handheld electronic device controlled by a user, such as a passenger or operator in the autonomous vehicle 102a. The passenger or operator can press buttons on the remote control 32 to change an operating state of the traffic light 12, such as causing the traffic light 12 to change from red to green. In other examples, the operator or user may press a button on the remote control 32 to cause the traffic light 12 to enter a particular operation mode or to perform a particular operation routine or pattern. For example, by pressing a button on the remote control 32, the user or operator can cause the traffic light 12 to begin to cycle through operating states, such as transitioning between green, yellow, and red in a predetermined sequence or pattern.

The system 10 can further comprise devices for obscuring an appearance of the traffic light 12 making it more difficult for the autonomous vehicle software to correctly detect and/or identify the state of the traffic light 12 in captured images. For example, as shown in FIGS. 2A, the system 10 can comprise an exhaust machine 34 for generating fog, smoke, dust, mist, rain, or other expelled particles, or similar obstructions directed towards the traffic light 12 to simulate real-life obstructions that make the traffic light 12 difficult to see in captured images. The system controller 14 can be in electrical communication with and configured to activate the exhaust machine 34 as the autonomous vehicle 102a approaches the traffic light 12 or intersection. For example, when the autonomous vehicle 102a is within the predetermined distance of the traffic light 12, the exhaust machine 34 can be activated and can begin to direct the fog or other obstructions towards the traffic light 12. Accordingly, images obtained by the camera(s) 262 of the autonomous vehicle 102a will include the fog or other obstructions. Captured images may be analyzed by the autonomous vehicle software to determine whether the software correctly detects the operational state of the traffic light 12 even when the fog and/or other obstructions are present.

With continued reference to FIGS. 2A and 2B, in some examples, the system 10 further comprises devices for adjusting, moving, or changing a position of the traffic light 12 to simulate, for example, a traffic light 12 swinging on an overhead cable. Image data including the swinging traffic light 12 can be analyzed by the autonomous vehicle software to determine whether the software correctly detects and monitors a state of the traffic light 12 even though a position of the traffic light 12 in images captured by the autonomous vehicle 102a changes.

In order to simulate the swinging traffic light 12, the system 10 can include a motorized winch 36 in electronic communication with the system controller 14. The motorized winch 36 can be configured to extend and/or retract the overhead cable 38 supporting the traffic light to cause the traffic light 12 to swing back and forth. As the autonomous vehicle 102a approaches the traffic light 12, the system controller 14 can be configured to provide instructions to the motorized winch 36 to activate the motorized winch 36 causing the traffic light 12 to swing back and forth.

Traffic Light Control System for Multiple Traffic Lights

With specific reference to FIG. 2B, in some examples, the traffic light control system 10 includes multiple traffic lights 12 that are electrically connected to and controlled by the single system controller 14. As previously described, the system controller 14 can be a dedicated electronic device comprising computer processors and other electronic circuitry contained in a housing, such as a metal box, positioned at an intersection. The system controller 14 can be electrically connected to the multiple traffic lights 12 by cables extending from the box to the traffic lights 12. As previous described, a variety of configurations of intersections 2 with multiple traffic lights 12 are shown schematically in FIGS. 3A-3C. For example, as shown in FIG. 3A, the intersection 2 is a four-way intersection between two-lane roads including two traffic lights 12 facing in each direction (eight total traffic lights). Each group of two traffic lights 12 can extend from a different overhead cable. In another example, as shown in FIG. 3C, the intersection is a four-way intersection between single lane roads including four total traffic lights 12 facing in different directions. The four traffic lights 12 can be positioned in a center of the intersection 2 and can be supported by the same overhead cable 38. The single system controller 14 can be configured to provide operating instructions to each of the traffic lights 12 to simulate different standard and non-standard scenarios for the autonomous vehicle 102a. The autonomous vehicle 102a can be configured to obtain images of the multiple traffic lights 12 as the autonomous vehicle 102a approaches the intersection 2. The collected image data can be analyzed to test the autonomous vehicle software.

In some examples, the system controller 14 is configured to provide instructions to the multiple traffic lights 12 in the intersection 2. For example, the system controller 14 can be configured to select an operation routine from routines stored on the computer-readable memory 26 of the controller 14. The routines can comprises instructions for the multiple traffic lights 12 in the intersection 2. Once the operation routine is selected, the system controller 14 can provide signals via the transceiver 24 to the multiple traffic lights 12 to control operation of the multiple traffic lights 12 according to the selected operation routine.

In some examples, an operation routine can include standard scenarios for multiple traffic lights 12 at an intersection 2. For example, in the four-way intersection of FIGS. 3A and 3B, one of the traffic lights 12 may include an illuminated green arrow signal 40 indicating that the autonomous vehicle 102a should enter the intersection 2 to make a right turn. Another traffic light 12 may continue to signal red indicating that vehicles intending to cross the intersection 2 or to make a left-hand turn should remain stopped until the traffic light 12 changes from red to green. The autonomous vehicle 102a may capture images showing both of the traffic lights 12, because both traffic lights 12 are located near each other and face in the same direction. The autonomous vehicle software is, therefore, required to evaluate captured images to determine which traffic light signal is relevant for planning a safe route through the intersection 2.

In other examples, the operation routine can include a non-standard scenario for the multiple traffic lights 12 requiring the autonomous vehicle 102a to plan a safe route through the intersection 2 accounting for the unexpected traffic light sequence. For example, the operation routine may cause one or more of the traffic lights 12 of the intersection 2 to flash, show two signals (e.g., both red and green) simultaneously, or cause one or more of the traffic lights 12 to turn off not showing any signal. In these instances, the autonomous vehicle software is required to analyze the captured images to recognize that the traffic lights 12 are operating in an unexpected manner and to determine whether it is safe to enter the intersection 2.

Optical Distortion Elements for Autonomous Vehicle Cameras

According to another aspect of the present disclosure, different optical elements and lens may be placed in front of the cameras 262 or vision sensors of the autonomous vehicle 102a to simulate obstructions that may be present in captured images and/or to simulate unusual lighting conditions, which may occur during use of an autonomous vehicle 102a. The traffic light control systems 10 of the present disclosure can be used in combination with the optical elements and lens covering the cameras 262 to test whether the autonomous vehicle software correctly detects the traffic lights 12 despite the optical distortions.

In some examples, optical elements or lens can be automatically moved within the field-of-view of the camera(s) 262 of the autonomous vehicle 102a to simulate changing lighting conditions. Examples of optical elements and motorized mounting devices for moving the optical elements or lens are described in U.S. patent application Ser. No. 17/382,586, entitled "Motorized Mounting Device for Positioning a Optical element Within a Field-of-View of a Vision Sensor and Method of Use", which is incorporated by reference herein in its entirety.

Figure 4A:
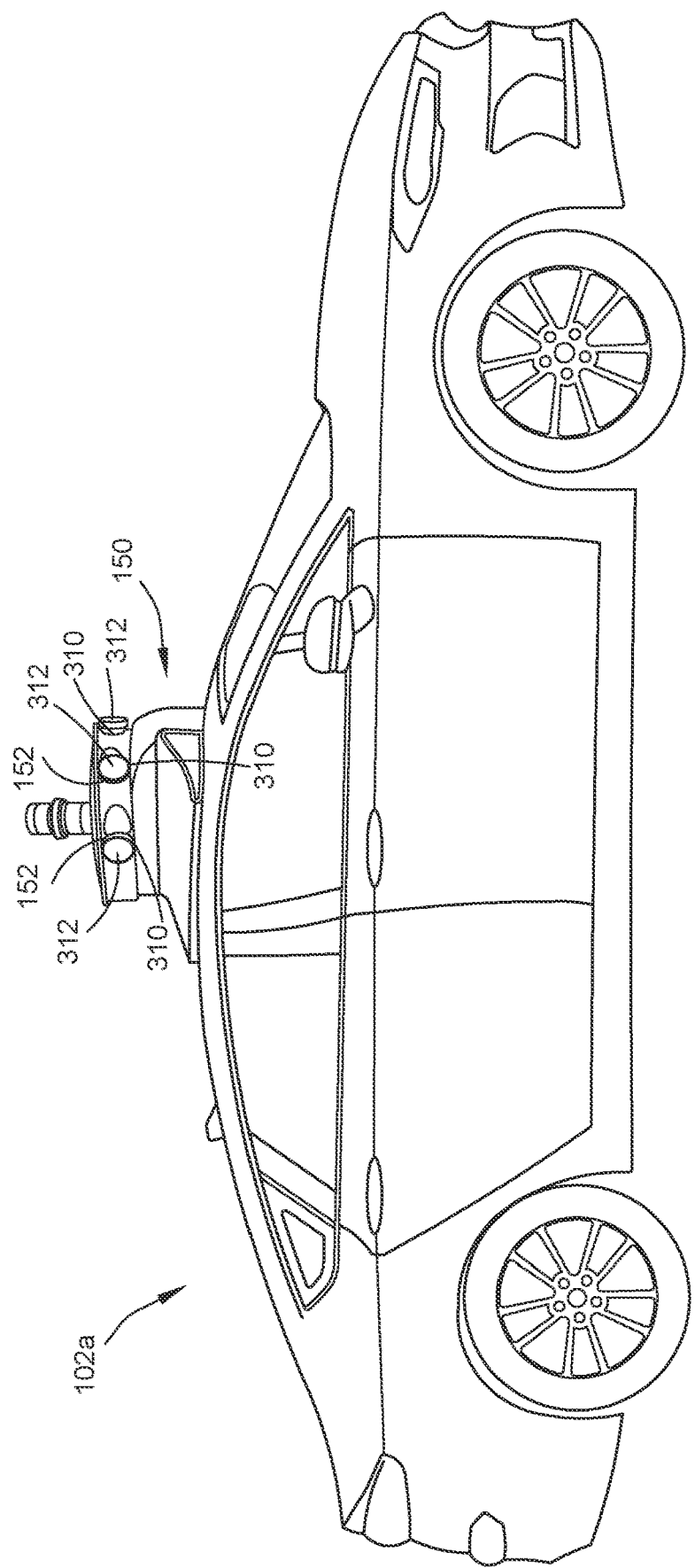
FIG. 4A is a side view of an autonomous vehicle including a sensor frame and motorized mounting devices for positioning optical elements over cameras of the vehicle, according to an aspect of the present disclosure.
Figure 4B:
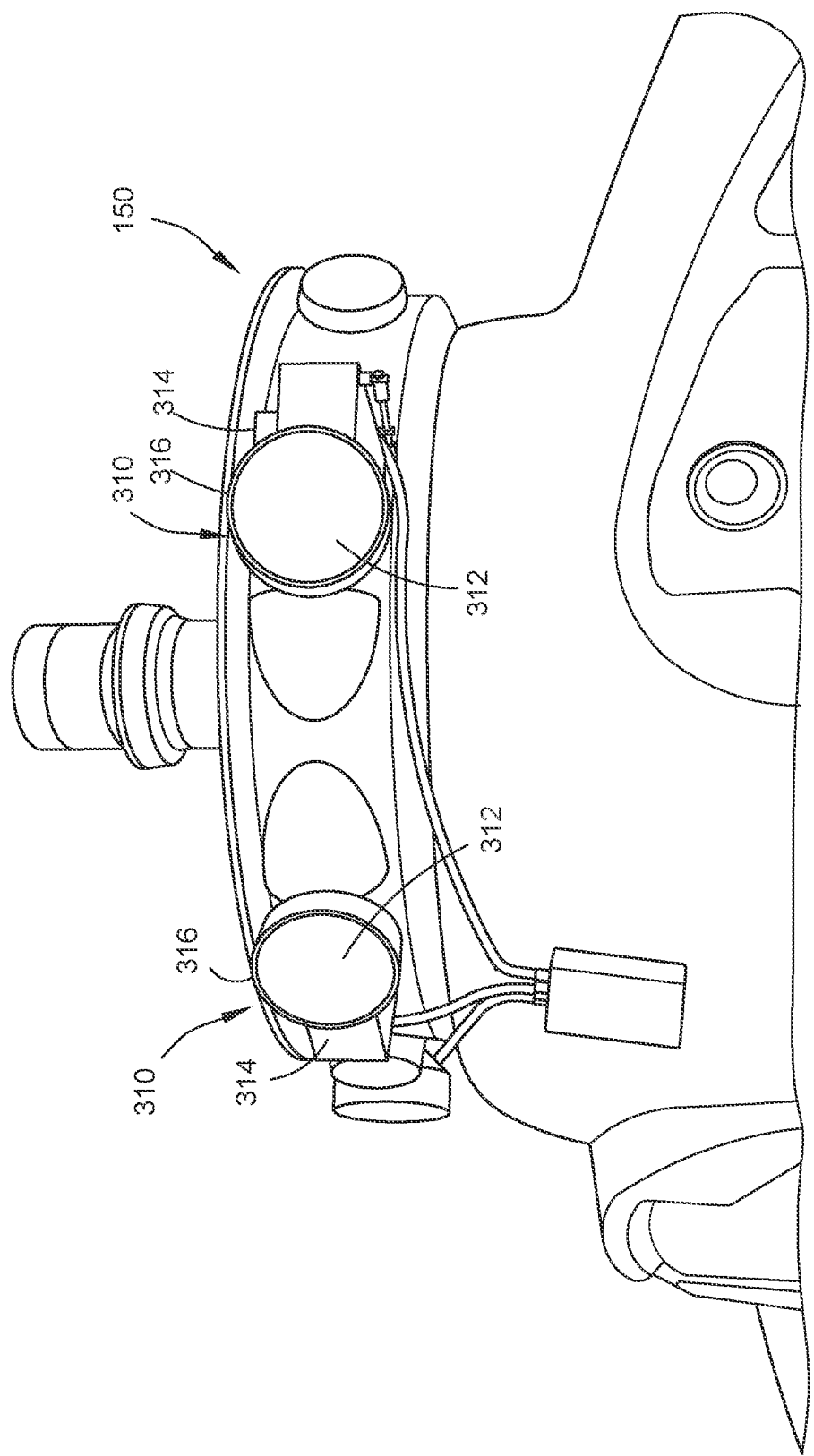
FIG. 4B is a perspective view of the sensor frame and motorized mounting devices of FIG. 4A.

An example of an autonomous vehicle 102a modified to include motorized mounting devices 310 for manipulating or moving optical elements 312 within a field-of-view of the cameras 262 of the autonomous vehicle 102a is shown in FIGS. 4A and 4B. The autonomous vehicle 102a can be an automobile, such as a four-door sedan. In other examples, as previously described, the autonomous vehicle 102a can be any other moving form of motorized or non-motorized conveyance within the scope of the present disclosure.

As shown in FIGS. 4A and 4B, the autonomous vehicle 102a comprises a sensor housing or sensor frame 150 for supporting the camera(s) 262 and other object-detection sensors for detecting objects and/or the environment surrounding the autonomous vehicle 102a. The housing or frame 150 is positioned on the roof of the autonomous vehicle 102a. In other examples, the frame 150 and/or other structures for supporting the cameras 262 can be positioned at many other locations on either the exterior of the autonomous vehicle 102a or inside a cabin of the autonomous vehicle 102a. An exemplary frame 150 for supporting cameras 262 and other vision and/or vision sensors on a autonomous vehicle 102a, referred to as the Tiara, which can be used with the motorized mounting devices 310 of the present disclosure, is manufactured by Argo AI of Pittsburgh, Pa. Those skilled in the art will appreciate that the mounting devices 310 of the present disclosure can also be adapted for use with many other vision sensors, cameras, and support structures within the scope of the present disclosure.

In some examples, the sensor housing or frame 150 includes the multiple openings or apertures 152 for the camera(s) 262 positioned around the sensor housing or frame 150. The camera(s) 262 and apertures 152 can be oriented in different directions to provide a panoramic view (i.e., a view of from 180 degrees to 360 degrees) of objects and/or the environment surrounding the autonomous vehicle 102a. The motorized mounting devices 310 and optical elements 312 are positioned proximate to the openings or apertures 152 for moving the optical elements 312 over or away from the apertures 152. The motorized mounting devices 310 can be mounted to an outer surface of the frame 150 by, for example, double-sided tape, adhesives, fasteners, or other mechanical or chemical connectors, as are known in the art. In FIGS. 4A and 4B, there is a motorized mounting device 310 proximate to each aperture 152. In other examples, some of the apertures 152 can include mounting devices 310, while others do not, so that image data can be captured both with and without visual distortion.

As shown in FIGS. 4A and 4B, the motorized mounting devices 310 can be mounted proximate to the apertures 152 and camera(s) 262, and are configured for selectively positioning the optical elements 312 within the field-of-view of the camera(s) 262. For example, the exemplary mounting device 310 can be configured to selectively position the optical element 312 within the field-of-view of the camera(s) 262 by pivoting, sliding, swinging, or otherwise moving the optical element 312 towards, or away from, the camera(s) 262 as image data is being collected by the camera(s) 262.

Figure 4C:
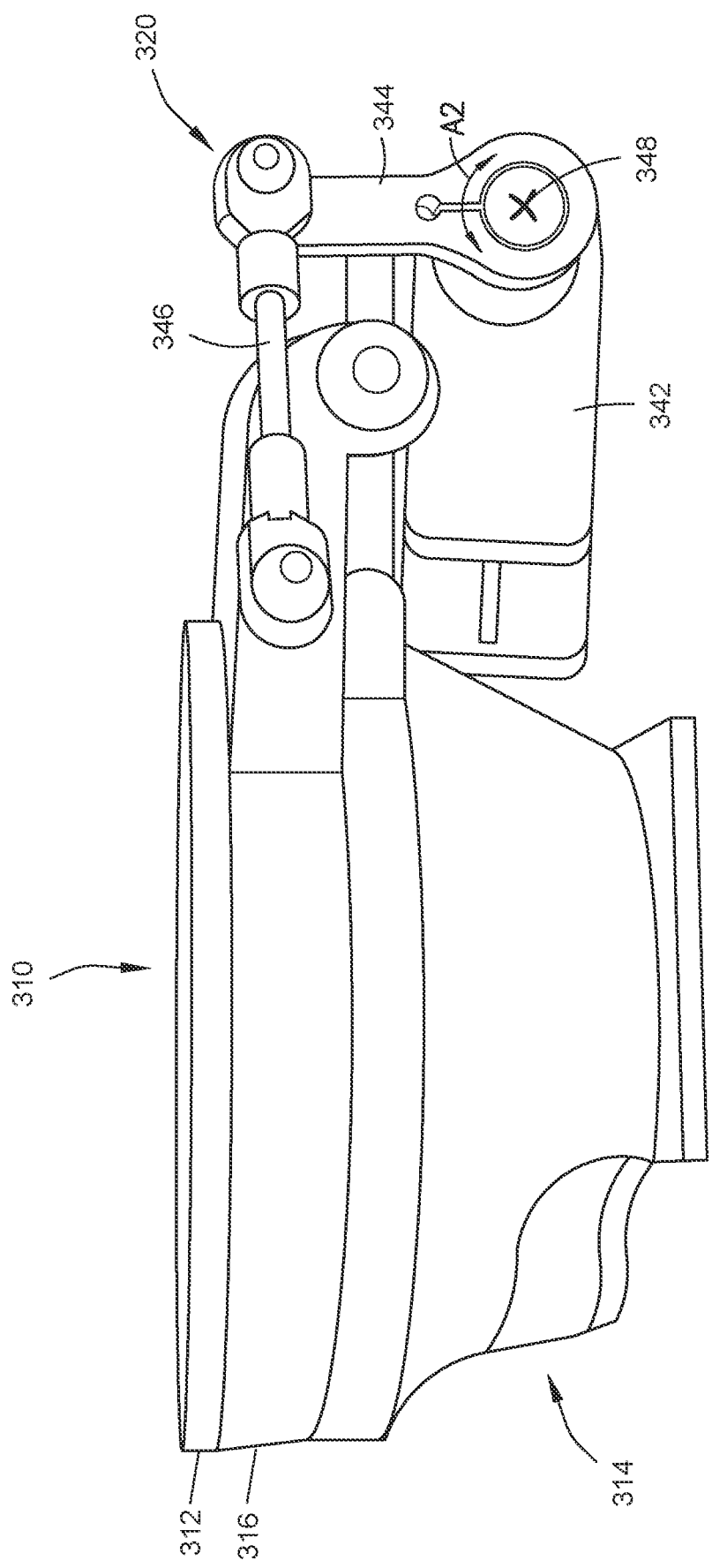
FIG. 4C is a side view of a motorized mounting device in a closed position, according to an aspect of the present disclosure.
Figure 4D:
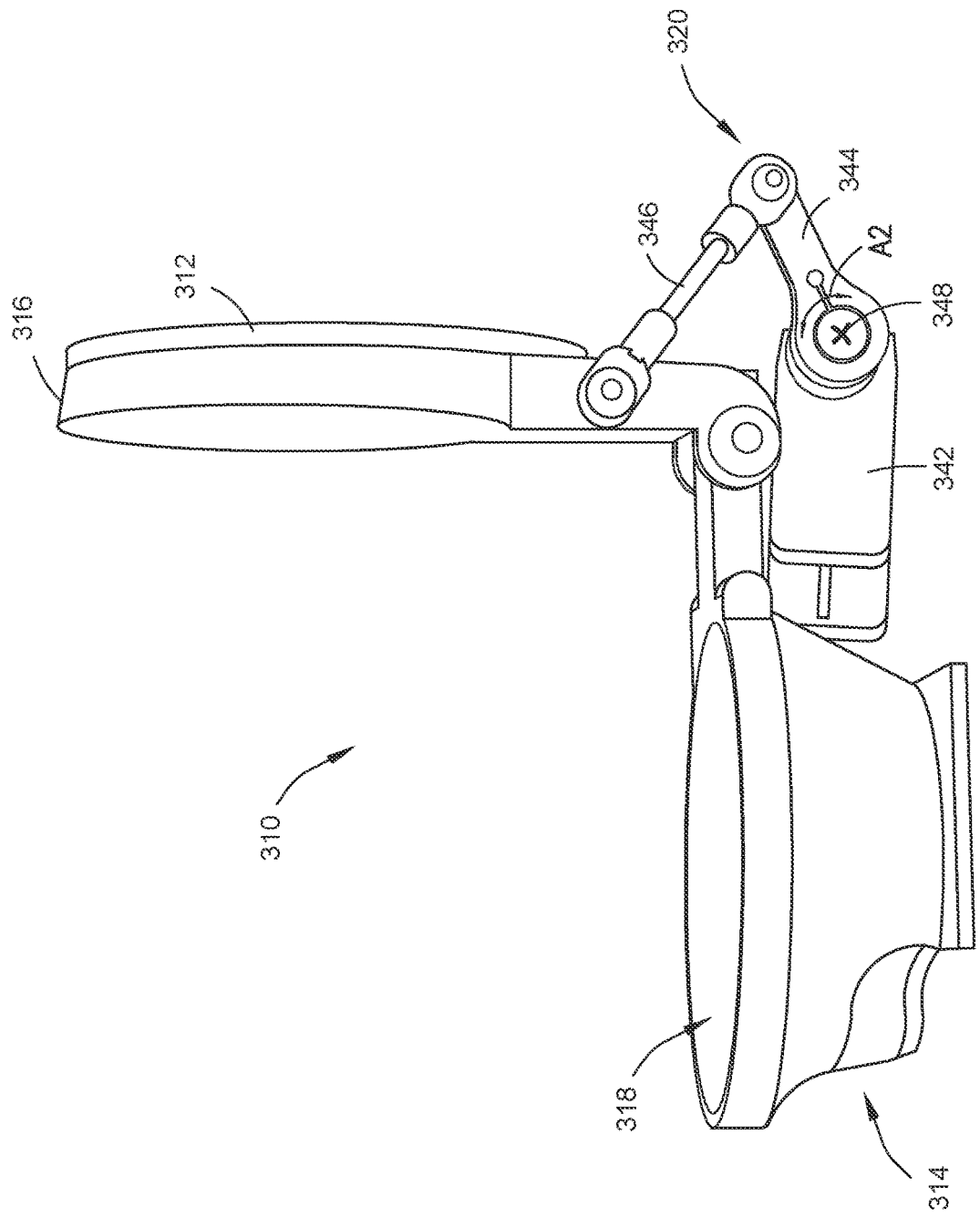
FIG. 4D is a side view of a motorized mounting device in an open position, according to an aspect of the present disclosure.

With reference to FIGS. 4C and 4D, in some examples, the motorized mounting device 310 comprises three separate components, namely a holder 316 for holding the optical element 312 in position over the camera(s) 262, a housing 314 defining an opening, central bore, or interior 318 (shown in FIG. 3D) sized to fit over the aperture 152 of the camera(s) 262, and a motorized actuator 320 for moving the holder 316 between a first position (e.g., partially closed or fully closed position shown in FIG. 4C) and a second position (e.g., a fully open or partially open position shown in FIG. 4D). As used herein, the "first position" or the "closed position" can be a position in which the optical element 312 is at least partially within the field-of-view and/or at least partially blocks the field-of-view of the camera(s) 262. The "second position" or the "open position" can be a position where a larger area of the optical element 312 is outside of the field-of-view of the camera(s) 262 than in the first or closed position and/or where a smaller portion of the field-of-view of the camera(s) 262 is blocked by the optical element 312, than when the optical element 312 is in the first or closed position.

The optical element 312 is generally a lens or filter, such as a lens or filter that is used with a conventional digital camera, adapted to include the visual obstructions or distortions described herein. For example, the optical element 312 can include a lens, such as an 82 mm camera lens or a lens of any other convenient size. The optical element 312 can be sized to be press-fit into the holder 316, thereby securely fixing the optical element 312 to the mounting device 310. In order to change optical elements 312, in some examples, a user can use a small flat tool (such as a small precision flat head screwdriver) to gently pry the optical element 312 away from the holder 316 by pressing a tip of the tool into a gap between the peripheral edge of the optical element 312 and an inner surface of the holder 316.

The optical element 12 can include, for example, a transparent, translucent, or opaque circular lens enclosed by a mounting ring sized to be engaged to the holder 316. The optical element 312 can also include an obstruction over a portion of the lens positioned to represent obstructions (i.e., dust, dirt, waste, mud, bird poop, scratches, insects, debris, rain drops, or leaves) that may cover a portion of the field-of-view of the camera(s) 262 during real-word use of the autonomous vehicle 102a and associated camera(s) 262. For example, the obstruction can be formed by adhering a coating, paint, tape, or an adhesive to a portion of the lens. Alternatively, obstruction(s) can be formed by scratching or otherwise deforming certain portions of the lens to distort images captured through the lens. In other examples, the optical element 312 can comprise an opaque lens, which emulates situations when the camera(s) 262 is entirely blocked by debris, such that the entire captured image is dark and/or distorted.

In other examples, the optical element 312 comprises a filter, such as a neutral-density (ND) filter. The neutral-density filter can be configured to approximate low-light conditions, which occur, for example, when the autonomous vehicle 102a is in a tunnel. Accordingly, when the filter is applied, images captured by the camera(s) 262 will be dark, at least for a brief time until light levels for the camera(s) 262 balance. Removal of the filter emulates exiting a tunnel, which suddenly exposes the camera(s) 262 to significantly brighter light (i.e., light of greater intensity). Images captured by the camera(s) 262 upon removal of the filter will be bright, over-exposed, and/or lack contrast, at least until light levels balance.

In accordance with the present invention, by selectively positioning the optical element 312 within the field-of-view of the camera(s) 262, image data can be generated that includes the distortions of the filter or lens created on demand, such that the captured dataset includes distorted images at known or predetermined times and for predetermined durations. The captured dataset can be processed and analyzed to test image analysis software and/or a vehicle perception system and, in particular, to determine whether the software or perception system correctly detects and/or appropriately classifies image data captured when the optical element 312 is in place within the field-of-view of the camera(s) 262.

In some examples, as shown in FIGS. 4C and 4D, the motorized actuator 320 includes a motor, such as a servomotor 342 used, for example, for remote control cars. Suitable servomotors 342 that can be adapted for use with the motorized mounting device 310 of the present disclosure are widely available from numerous manufacturers including, for example, Kpower Technology Co., AMain Sports & Hobbies, Savox USA, and others. The servomotor 342 can be operatively engaged to the holder 316 through linking arms, such as a first arm 344 hingedly connected to a second linking arm 346. The servomotor 342 is configured to rotate the first arm 344, as shown by arrow A2, about a rotation point 348, which causes the second linking arm 346 to move the holder 316 (and optical element 312 engaged thereto) between the first or closed position (shown in FIG. 4C) and the second or open position (shown in FIG. 4D).

With reference again to FIG. 2A, the mounting device 310 can be electrically coupled to the system controller 14 of the traffic light control system 10 for controlling the mounting device 310 as the autonomous vehicle 102a approaches the traffic light(s) 12. This allows the system 10 to collect image data for the traffic light 12 when images are obscured or distorted by optical elements 312 positioned over the camera 262 or vision sensor by the motorized mounting device 310. The collected image data can be analyzed by the autonomous vehicle software to determine whether the software correctly detects the operating state of the traffic light 12 when images are obscured by optical elements over the camera(s) 262.

In some examples, the optical element 312 includes distortions or imperfections over limited portions of the optical element 312, such that some portions of images captured by the camera 262 are clear, while other portions are distorted. In some cases, the system controller 14 can be configured to cause the motorized mounting device 310 to move the optical element 312 to the first (e.g., closed) position as the autonomous vehicle 102a approaches the traffic light 12 to simulate an obstruction obscuring at least a portion of the traffic light 12. In that case, the autonomous vehicle software may be configured to ignore portions of captured images including substantial distortions, while processing and analyzing other portions of the captured images to determine information about the traffic light 12 and/or other objects in proximity to the autonomous vehicle 102a.

The optical element 312 and motorized mounting device 310 can also be used to simulate images captured as the autonomous vehicle 102a moves from a low-light environment to a brighter environment, as occurs when the autonomous vehicle 102a exits a tunnel. For example, the system controller 14 can be configured to cause the motorized mounting device 310 to move a neutral density filter from the first (e.g., closed) position to a second (e.g., open) position when the autonomous vehicle 102a is within a predetermined distance of the traffic light 12. As previously described, removing the neutral density filter from the camera(s) 262 causes captured images to be very bright at least until the camera(s) 262 adapt to the changed lighting conditions. Image datasets captured during removal of the neutral density filter can be analyzed by the autonomous vehicle software or perception system to determine whether the software correctly detects traffic light(s) 12 in captured images and identifies the state of the traffic light(s) 12 even though the captured images may be bright or washed-out due to removal of the neutral density filter.

Programmable Traffic Lights

With reference to FIGS. 5A and 5B, in some examples, a traffic light 412 for testing an autonomous vehicle 102a can be manufactured or modified to include electrical components for controlling operation of the traffic light 412 according to operation routines stored on computer readable memory 426 of the traffic light 412. Therefore, in contrast to previous examples where instructions and control signals generated by a separate controller were provided to one or more traffic lights 412, the programmable traffic light 412 shown in FIGS. 5A and 5B is configured to perform such functions independent from external controllers or control devices.

As shown in FIGS. 5A and 5B, the programmable traffic light 412 comprises a housing 442, such as a metal or plastic box or container, containing electrical components of the traffic light 412. The traffic light 412 can be arranged in a standard three-light vertical configuration with a first or red signal 416 viewable through a first opening 444 in the housing 442 illuminated by a first group of light emitters 422. For example, the first group of light emitters can include two, three, or more light emitters 422 so that if one light emitter 422 fails, the traffic light 412 can continue to display a correct signal at an intended time. The traffic light 412 also includes a second or yellow signal 418 viewable through a second opening 446 in the housing 442 illuminated by a second group of light emitters 422 of the traffic light 412 and a third or green signal 420 viewable through a third opening 448 in the housing 442 illuminated by a third group of light emitters 422. In some examples, the traffic light 412 can also include a fourth signal (not shown) viewable through a fourth opening, which can provide, for example, a right or left turn signal.

As shown in FIG. 5B, the programmable traffic light 412 can also include a wired and/or wireless transceiver 424 in the housing 442 configured to receive instructions or other information from remote electronic devices or systems. For example, instructions could be received from a remote control device used by an operator or rider in the autonomous vehicle 102a. In other examples, the transceiver 424 may receive information from sensors or detectors in proximity to the programmable traffic light 412, such as from location, proximity, or environment sensors or sensing devices positioned in or near the intersection.

In some examples, the traffic light 412 further comprises an integrated proximity sensor 430, such as the laser range finder. For example, the proximity sensor 430, such as the laser range finder, can be mounted to the housing 442 of the traffic light 412 and electrically connected to a traffic light controller 414 located in the housing 442. The proximity sensor 430, such as the laser range finder, can be configured to project a laser from the traffic light 412 towards the roadway and to detect when a vehicle, such as the autonomous vehicle 102a, approaches the intersection and is contacted by the laser.

The programmable traffic light 412 also includes the traffic light controller 414 contained within the housing 442 of the traffic light 412 configured to perform similar functions to the previously described system controller. The traffic light controller 414 can be in electronic communication with the wired or wireless transceiver 424 and with the proximity sensor 430. In some examples, the traffic light controller 414 can be configured to select an operation routine for the traffic light 412 from operation routines on the computer-readable memory 426. The selection can be based, for example, on information received from the remote electronic device via the wired or wireless transceiver 424. In other examples, the selection can be based on information received from external sensors and detecting devices and/or from the integrated proximity sensor 430. In still other examples, the selected signal can be based on a predetermined schedule for operation routines stored or programmed on the memory 426 of the traffic light 412. The traffic light controller 414 is further configured to control operation of the light emitters 422 of the traffic light 412 according to the selected operation routine. For example, controlling operation of the programmable traffic light 412 can include turning on or off some or all of the light emitters 422 of the traffic light 412 and/or changing a brightness, frequency, or intensity of some or all of the light emitters 422 of the traffic light 412.

In some examples, as previously described, a selected operation routine can comprise an instruction to turn on or off specific light emitters 422 of the programmable traffic light 412 according to a predetermined pattern. In other examples, the operation routine implemented by the programmable traffic light 412 can include an instruction to reduce a brightness of some or all of the light emitters 422 of the programmable traffic light 412. For example, a brightness of some or all of the light emitters 422 may be reduced to less than 100%, less than about 50%, or, preferably, less than about 15% of a maximum brightness of the light emitter(s) 422 to simulate traffic light malfunctions or other equipment problems. In some examples, the instruction can also include an instruction to adjust the frequency of the light emitters 422 of the traffic light 412. For example, as previously described, an operation routine may adjust frequency (hz) or duty cycle of the light emitters 422 to simulate a flickering light. In some examples, the oscillating signal can be provided from an oscilloscope 428 contained within the housing 442 of the programmable traffic light 412. The oscilloscope 428 can be electrically connected between the controller 414 and the light emitters 422 and can be configured to provide an oscillating signal to the light emitters 422 causing the light emitters 422 to flicker at a selected frequency and duty cycle. As previously described, autonomous vehicle software can analyze captured images of the traffic light 412 to determine whether the software correctly detects the state of the traffic light 412 despite the adjusted brightness or flickering light emitters 422.

Methods for Generating Image Data and Testing Software and Perception Systems

The traffic light control system 10 and programmable traffic light 412 of the present disclosure can be used to create datasets of images captured by the camera(s) 262 of the autonomous vehicle 102a including images of the traffic light(s) 12, 412. The created image datasets are used, as previously described, for testing the image analysis software or perception systems of the autonomous vehicle 102a to determine whether the software and perception systems correctly detect the traffic light(s) 12, 412 and identify changes in a state of the traffic light 12, 412. Exemplary perception systems and image processing techniques that can be evaluated using the methods disclosed herein are described, for example, in U.S. Patent Appl. Pub. No. 2021/0107566, entitled "Methods and systems for lane changes using a multi-corridor representation of local route regions" and U.S. Patent Appl. Pub. No. 2021/0108936, entitled "Methods and systems for topological planning in autonomous driving", which are incorporated herein by reference herein in their entireties. Flowchart showing methods that can be performed to obtain and analyze a dataset of images are shown in FIGS. 6A-6E.

In some examples, image processing and analysis can occur in real-time during operation of the autonomous vehicle 102a. In other examples, image analysis can be a post-processing activity, where image data is analyzed at a later time to test, evaluate, and/or optimize the software and perception systems or to test new software. For example, different software or algorithms may be used to analyze the same dataset, allowing users to assess which software or algorithms are most likely to correctly identify the traffic light(s) 12, 412 despite certain image distortions or the occurrence of non-standard traffic light scenarios. Generated image datasets can also be used to create simulations including different types of distortions or non-standard scenarios, so that currently in-use analysis software and systems can be modified and optimized to improve identification for different types of distortions and obstructions.

One reason for using simulations to create image datasets for testing is that image data collected during real-world use of the autonomous vehicles 102a may not be of sufficient quality to fully test the vehicle software. For example, during real-world operation of the autonomous vehicle 102a, image data can be collected as low-resolution data to reduce time required to process or transmit data and/or to reduce computer memory required to store data collected by the vision sensors of the autonomous vehicle 102a. During real-world operation of the autonomous vehicle 102a and camera(s) 262, high resolution image data may only be collected, for example, after faults are detected or at other times when collected image data is expected to be particularly relevant, important, and/or interesting. Datasets including the captured low-resolution data, only occasionally interspersed with high-resolution data, may not be suitable for use in testing image analysis software or vehicle perception systems because some real-life key events may be missed or only captured at a lower resolution than is needed to make confident coding improvements to the software or perception system. Accordingly, in some examples, entire image datasets generated by the methods disclosed herein can be collected as high-resolution data. The high-resolution data can include images of traffic lights as the traffic lights change states. Collected image data can be analyzed by autonomous vehicle software to determine a preferred or safe route through, for example, an intersection or along a roadway.

Testing Methods Using a Traffic Light Controlled with a Proximity Sensor

Figure 6A:
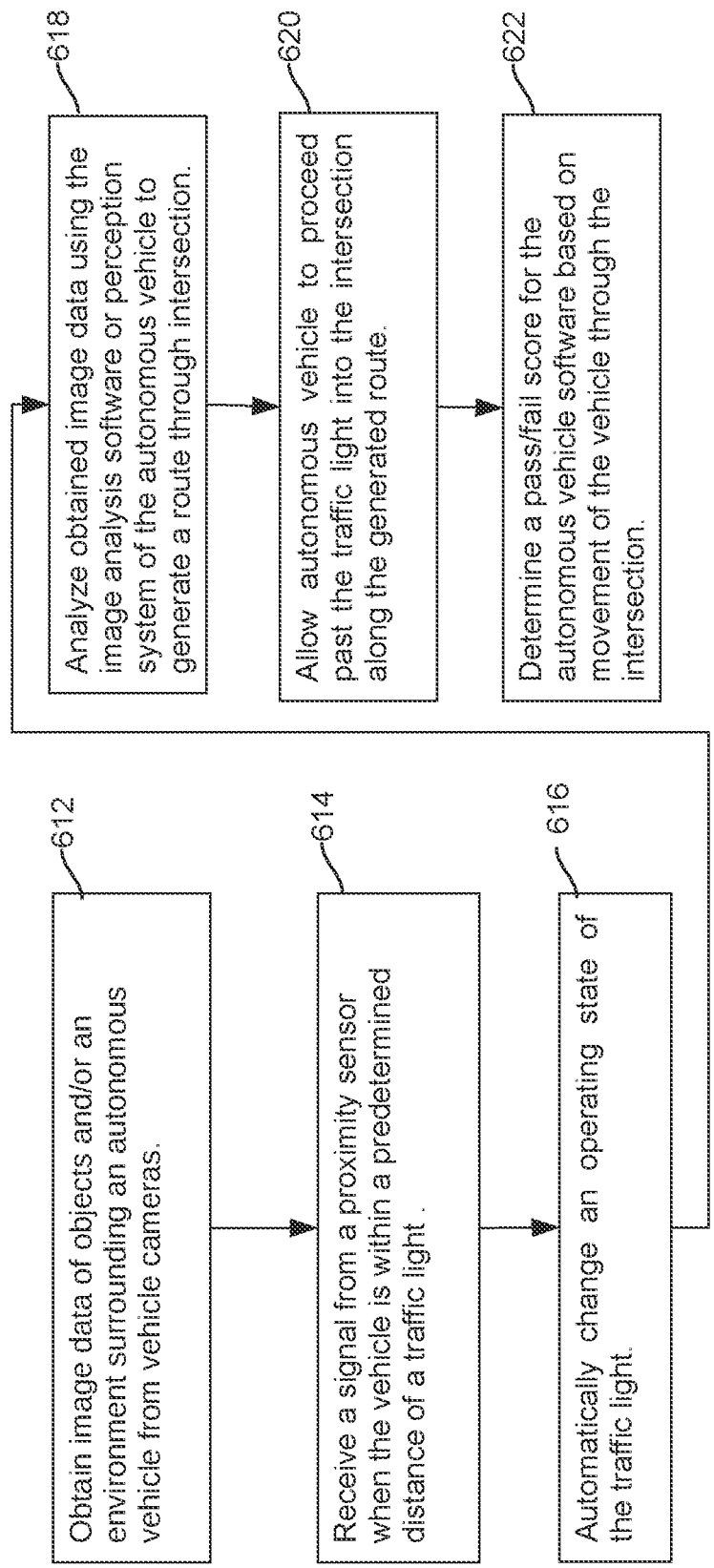

FIG. 6A is a flow chart showing steps of a method for testing and evaluating image analysis software or a perception system of an autonomous vehicle 102a as the autonomous vehicle 102a approaches a traffic light 12, 412. At step 612, the method comprises obtaining image data of objects and/or an environment surrounding the autonomous vehicle 102a from the camera(s) 262 of the autonomous vehicle 102a. At step 614, the method further comprises receiving a signal from a proximity sensor 30, 430 when the autonomous vehicle 102a is within a predetermined distance of the traffic light 12, 412. For example, as previously described, a laser range finder or similar device can be integrated with or mounted to the traffic light 12, 412 or to another device or structure in proximity to an intersection and can be configured to detect the autonomous vehicle 102a to determine when the autonomous vehicle 102a is within the predetermined distance of the traffic light 12, 412. The predetermined distance can be, for example, from about 20 meter to about 40 meters from the traffic light 12, 412, as measured by the proximity sensor 30, 430. The method can include continuing to obtain images of the intersection and environment until the autonomous vehicle 102a moves past the intersection by a predetermined distance, such as a distance of about 40 meters.

At step 616, when the autonomous vehicle 102a is within the predetermine distance, the method can further comprise automatically changing an operating state of the traffic light 12, 412. For example, the method can include causing the traffic light 12, 412 to change state in a standard or expected manner (e.g., causing the traffic light 12, 412 to change from a green signal 20, 420, to a yellow/amber signal 18, 418, to a red signal 16, 416) as the autonomous vehicle 102a approaches the intersection. As previously described, changing the operating state or operating routine of the traffic light 12, 412 can also include turning on or off light emitters 22, 422 of the traffic light 12, 412 and/or changing a brightness, frequency, or intensity of the light emitters 22, 422 of the traffic light 12, 412.

At step 618, the method further comprises analyzing the obtained image data using the image analysis software or perception system of the autonomous vehicle 102a. For example, analysis of captured images can include analyzing images collected by the camera(s) 262 of the autonomous vehicle 102a to determine whether the image analysis software or perception system correctly detects the traffic light 12, 412 and identifies when the traffic light 12, 412 changes state.

In some examples, image processing and analysis can occur in real-time during operation of the autonomous vehicle 102a. In other examples, image analysis can be a post-processing activity where image data is analyzed at a later time to test, evaluate, and/or optimize the software and perception systems or to test new software. For example, as previously described, different software or algorithms may be used to analyze the same dataset, allowing users to assess which software or algorithms are most likely to correctly identify certain standard or non-standard traffic light scenarios. Generated image datasets can also be used to create simulations including different types of traffic light scenarios, so that currently in-use analysis software and systems can be modified and optimized to improve identification for different types of obstructions or scenarios. In some examples, the analysis of the image data can also include analyzing the obtained images to plan a route through an intersection that includes traffic light(s) 12, 412. At step 620, the method further comprises allowing the autonomous vehicle 102a to proceed past the traffic light 12, 412 into the intersection along the planned or generated route.

At step 622, in some examples, analyzing the obtained image data set can also include determining a pass/fail score for the autonomous vehicle 102a based on obtained image data. For example, image data showing the autonomous vehicle 102a passing through the intersection along the planned route can be analyzed to determine whether the autonomous vehicle 102a moves safely through the intersection as expected. Based upon the review or analysis, a score can be assigned for the particular software or perception system used to evaluate the image data. The generated pass/fail score for the autonomous vehicle 102a can consider whether the vehicle safely passed through the intersection and/or whether the analysis software correctly detected traffic light(s) 12, 412 and identified states of the traffic lights 12, 412 in an efficient manner. For example, the score can be a simple pass when the autonomous vehicle 102a moves safely through the intersection or a fail when the autonomous vehicle 102a does not perform as expected. In other examples, a letter or numeric grade can be assigned for each software or perception system to evaluate how well the software detects and responds to the traffic lights 12, 412.

Testing Methods with a Traffic Light Controlled by a Remote Control Device

FIG. 6B is a flow chart showing steps of another method for testing or evaluating image analysis software or a perception system of an autonomous vehicle 102a as the autonomous vehicle 102a approaches a traffic light 12, 412. Unlike in the previous example, in the method of FIG. 6B, the operation state of the traffic light 12, 412 is changed manually. For example, the operation state of the traffic light 12, 412 may be changed manually by an operator, user, or rider in the autonomous vehicle 102a using, for example, the remote control device 32, such as a handheld key fob.

As shown in FIG. 6B, at step 624, as in previous examples, the method can comprise obtaining image data of objects and/or an environment surrounding the autonomous vehicle 102a from the camera(s) 262 of the autonomous vehicle 102a as the autonomous vehicle 102a approaches the traffic light 12, 412. At step 626, the method can further comprise receiving a signal from the remote control device 32 used by an operator or user of the autonomous vehicle 102a. The signal from the remote control device 32 can include an instruction from the user for changing an operating state of one or more traffic lights 12, 412 in the intersection. For example, the instruction can cause the traffic light 12, 412 to select and implement an operation routine for the traffic light(s) 12, 412. In some examples, the selected operation routine can cause the traffic light 12, 412 to perform in a standard or expected manner (e.g., causing the traffic light 12, 412 to change from a green signal 20, 420, to a yellow/amber signal 18, 418, to a red signal 16, 416) as the autonomous vehicle 102a approaches the intersection. As previously described, changing the operating state or operating routine of the traffic light 12, 412 can also include turning on or off light emitters 22, 422 of the traffic light 12, 412 and/or changing a brightness, frequency, or intensity of light emitters 22, 422 of the traffic light 12, 412.

At step 628, the method further comprises causing the traffic light(s) 12, 412 to change an operating state according to the selection or instruction provide by the user via the remote control device 32. For example, the system controller 14 or traffic light controller 414 can be configured to transmit a signal to the traffic lights 12, 412 in the intersection causing the traffic lights 12, 412 to change state. At step 630, the method further comprises analyzing the obtained image data using the image analysis software or perception system for analysis of images collected by the camera(s) 262 to determine whether the image analysis software or perception system correctly identifies the changed state of the traffic light(s) 12, 412. In some examples, the analysis of the image data can also include analyzing the obtained images to plan a route through the intersection with the traffic light(s) 12, 412. At step 632, the method further comprises allowing the autonomous vehicle 102a to proceed past the traffic light 12, 412 into the intersection along the generated or planned route.

Testing Methods for Analysis of Image Data Including Obstructions

Figure 6C:
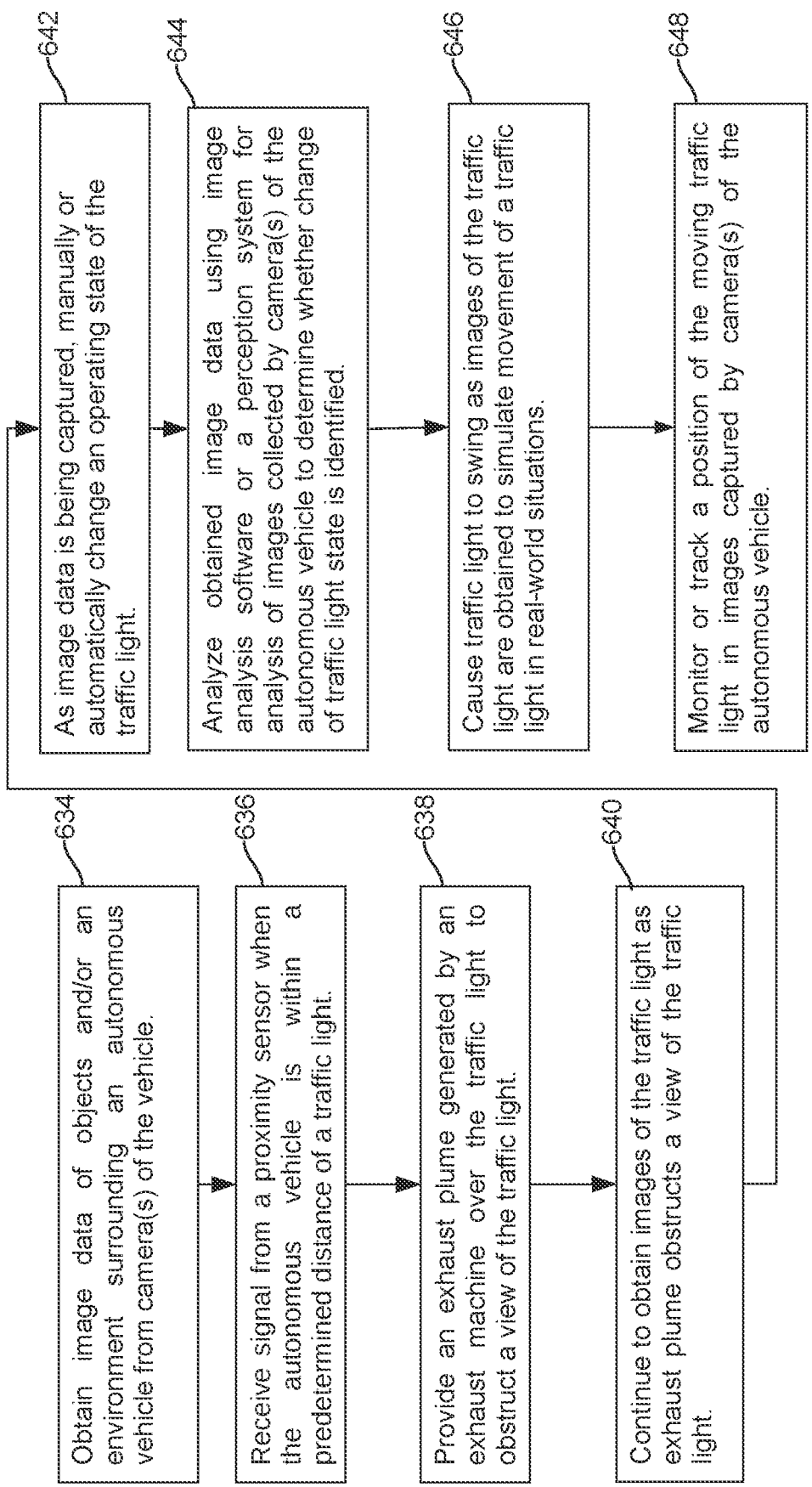

FIG. 6C is a flow chart showing steps of another method for testing or evaluating image analysis software or a perception system of an autonomous vehicle 102a as the autonomous vehicle 102a approaches a traffic light 12, 412. At step 634 in FIG. 6C, the method can comprise obtaining image data of objects and/or an environment surrounding the autonomous vehicle 102a from the camera(s) 262 as the autonomous vehicle 102a approaches a traffic light 12, 412.

At step 636, the method further comprises receiving a signal from the proximity sensor 30, 430 when the autonomous vehicle 102a is within a predetermined distance of the traffic light 12, 412. At step 538, the method further comprises, upon receiving the indication that the autonomous vehicle 102a is within the predetermined distance of the traffic light 12, 412, providing an exhaust plume, such as an exhaust plume generated by an exhaust machine 34, over the traffic light 12, 412 to obstruct a view of the traffic light 12, 412. For example, the obstruction can simulate fog, smoke, dust, mist, rain, or other expelled particles that make the traffic light 12, 412 difficult to see. As previously described, the exhaust plume can be created by an exhaust machine 34, such as a fog machine or air cannon, that projects particles towards the traffic light 12, 412. The exhaust machine 34 can continue to generate the exhaust plume as the autonomous vehicle 102a approaches the traffic light 12, 412 and intersection and/or until the autonomous vehicle 102a passes through the intersection.

At step 640, the method further comprises continuing to obtain the images of the traffic light 12, 412 even as the exhaust plume obstructs a view of the traffic light 12, 412. At step 642, the method can further comprise, as the image data is being captured, manually or automatically changing the operating state of the traffic light 12, 412. For example, as previously described, the operating state of the traffic light 12, 412 can be manually or automatically changed based, for example, on a signal received from a remote control device 32, 432 or from an external sensor device, such as the proximity sensor 30, 430.

At step 644, the method can further comprise analyzing the obtained image data using the image analysis software or perception system for analysis of images collected by the camera(s) 262 of the autonomous vehicle 102a to determine whether the image analysis software or perception system correctly detects the traffic light 12, 412 in captured images despite the fact that the traffic light 12, 412 is partially obscured by the fog or other particles of the exhaust plume. The images can also be analyzed to determine whether the image analysis software correctly identifies the changes in the state of the traffic light 12, 412 that occur as the autonomous vehicle 102a approaches the traffic light 12, 412 and intersection through the fog, smoke, dust, mist, rain, or other obstructions.

With continued reference to FIG. 6C, in some examples, the method can further comprise, at step 646, causing the traffic light 12, 412 to swing as the images of the traffic light 12, 412 are obtained to simulate movement of a traffic light 12, 412 that can occur in real-world situations. For example, as previously described, a motorized winch 36 can be activated causing a cable 38 attached to the traffic light 12, 412 to extend and retract, thereby causing the traffic light 12, 412 to swing back and forth. In that case, at step 648, the image analysis can also comprise monitoring or tracking a position of the moving traffic light 12, 412 in various images captured by the camera(s) 262 of the autonomous vehicle 102a. In particular, the autonomous vehicle software can be configured to distinguish between a swinging traffic light 12, 412 that appears in different positions in different captured images and, for example, two different traffic lights 12, 412 in the intersection. Once the position of the swinging traffic light 12, 412 is determined, the image analysis software can be configured to determine the state of the traffic light 12, 412, as previously described.

Methods for Simulating Transition from Low-Light to Normal Light

Figure 6D:
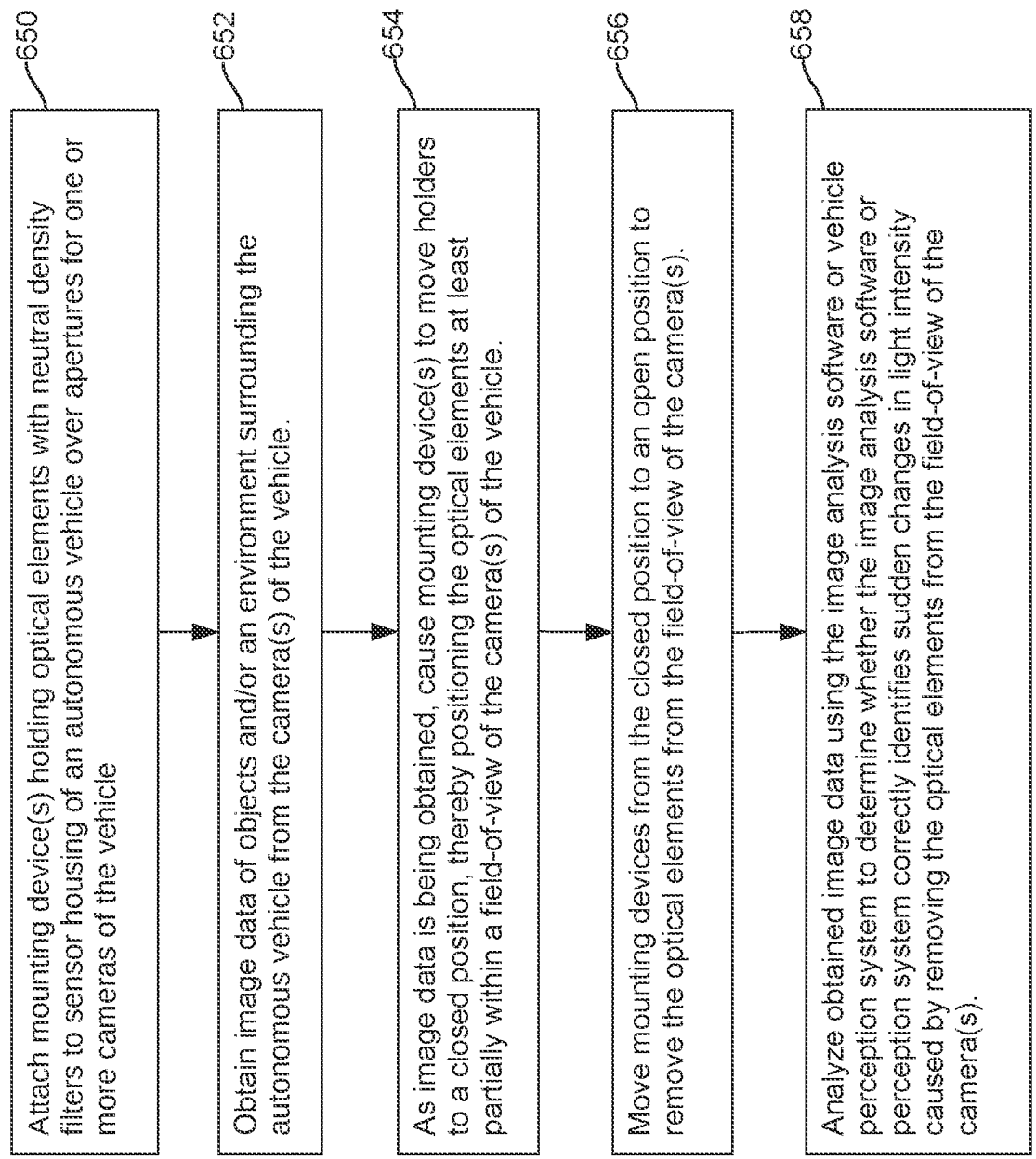

FIG. 6D is a flow chart showing a method for testing or evaluating the image analysis software of the autonomous vehicle 102a as the autonomous vehicle 102a moves from a low-light environment to a brighter or normal light environment using the previously described mounting device 310. As shown in FIG. 6D, at step 650, a user attaches one or more mounting devices 310 to the sensor housing or frame 150 of the autonomous vehicle 102a, such that an opening, central bore, and/or interior of the device housing 314 of each mounting device 310 is over the aperture 152 of one of the cameras 262 of the frame 150. Once the mounting device or devices 310 are in place proximate to the apertures 152 of the cameras 262, at step 652, image data of objects and/or the environment surrounding the autonomous vehicle 102a is obtained from the camera(s) 262.

At step 654, the method further comprises, as the image data is being captured, causing the mounting device or devices 310 to move their respective holders 316 to the first or closed position, thereby positioning the optical element 312 at least partially within the field-of-view of the camera(s) 262. As previously described, the optical element 312 can be a camera lens comprising a filter, such as the neutral-density filter, that approximates low-light conditions. The neutral-density filter is used to capture image data that emulates image data that would be obtained when, during real world operation of the autonomous vehicle 102a, the autonomous vehicle 102a is in a dark location, such as a tunnel. When the optical element 312 comprising the neutral-density filter is in place, the captured image data is dark (i.e., the intensity of light captured by the camera(s) 262 is reduced for all wavelengths compared to when no filter is present).

At step 656, after a predetermined time or when the autonomous vehicle 102a is within a predetermined distance of the traffic light 12, 412, the mounting devices 310 transition to a second position or opens, thereby removing the optical element 312 including the neutral density filter from the field-of-view of the camera(s) 262. Removing the optical element 312 causes the obtained image data, which includes the traffic light 12, 412, to appear to be exceptionally bright, at least until light levels for the camera(s) 262 balance. Desirably, image analysis software should identify such sudden changes in light intensity in captured image data as a normal event that occurs when the autonomous vehicle 102a exits a tunnel, and not as an anomaly, malfunction, or other unexpected condition.

At step 658, the method further comprises analyzing the obtained image data using the image analysis software or vehicle perception system to determine whether the image analysis software or perception system correctly identifies sudden changes in light intensity caused by removing the optical element 312 from the field of view of the camera(s) 262. Analyzing the image data also includes determining whether the autonomous vehicle software can correctly detect the traffic light and detect changes in the state of the traffic light even as the vehicle moves from a low-light environment to a brighter or regular light environment.

Methods for Simulating Sunlight Reflectance

Figure 6E:
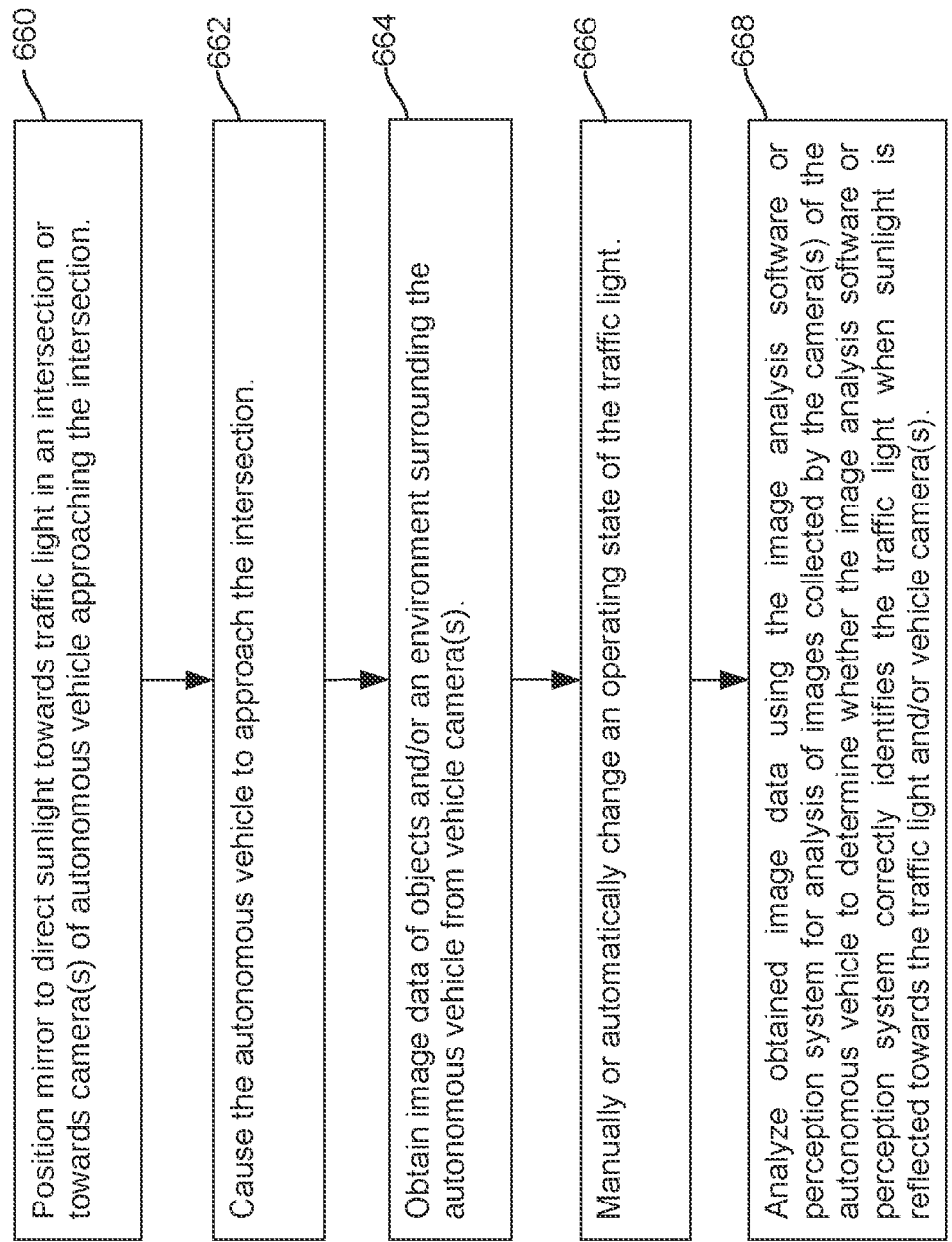
Figure 7B:
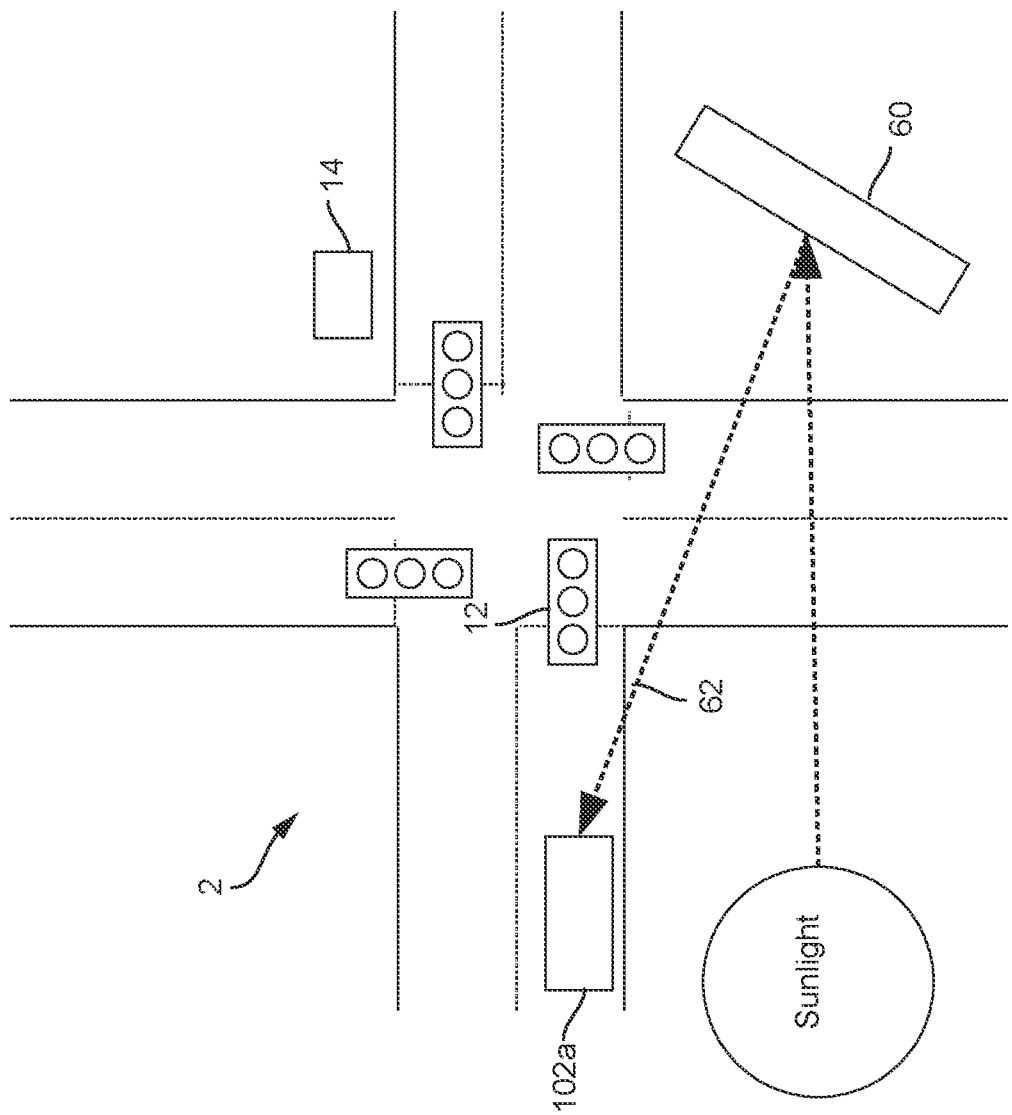
FIG. 7B is a drawing an aerial view of another intersection including an autonomous vehicle, traffic lights, and a mirror for directing sunlight towards camera(s) of the autonomous vehicle, according to an aspect of the present disclosure.

In another example, the traffic light control system 10 and programmable traffic light 412 of the present disclosure can be used to create datasets of images including images of the traffic light 12, 412 that are obscured by bright reflected light to simulate reflections caused by bright sunlight. For example, sunlight may reflect off of the traffic light 12, 412 making it difficult to see signals 16, 18, 20 of the traffic light 12, 412 and/or to determine which signals 16, 18, 20 are illuminated and which are dark. Sunlight may also shine directly on the camera(s) 262 of the autonomous vehicle 102a making it difficult to obtain reasonable quality images of the traffic light 12, 412 and other objects in proximity to the autonomous vehicle 102a. As described in further detail herein, one or more mirrors 60 can be used to direct sunlight towards the traffic light 12, 412 and/or autonomous vehicle 102a along a path 62 (shown in FIGS. 7A and 7B) to simulate effects of direct sunlight. The obtained image datasets can be processed and analyzed by the autonomous vehicle software to determine whether the software can correctly detect and determine a state of a traffic light 12, 412 when sunlight reflectance occurs. A flowchart showing a testing method that can be performed to obtain and analyze the dataset of images showing bright sunlight reflections is shown in FIG. 6E. Schematic drawings of intersections 2 including the mirrors 60 for directing the sunlight along the path 62 towards the traffic light 12, 412 and/or the autonomous vehicle 102a are shown in FIGS. 7A and 7B.

With reference to FIG. 6E, the method for testing or evaluating image analysis software or a perception system of an autonomous vehicle 102a includes, at step 660, positioning the mirror 60 to direct sunlight towards the traffic light 12, 412 or towards the camera(s) 262 or vision sensors of the autonomous vehicle 102a. For example, as shown in FIG. 7A, the mirror 60 is positioned near the intersection 2 and angled to direct the sunlight towards the traffic light 12, 412, so that the sunlight reflects from the traffic light 12, 412 making the traffic light 12, 412 difficult to see or detect in captured images. In FIG. 7B, the mirror 60 is positioned on an opposite side of the intersection 2 from the example of FIG. 7A. The mirror 60 of FIG. 7B is angled to directed the sunlight directly towards the autonomous vehicle 102a making it difficult for the camera(s) 262 of the autonomous vehicle 102a to capture clear images of the traffic light 12, 412 and other objects around the autonomous vehicle 102a.

At step 662, the autonomous vehicle 102a is then permitted to approach the intersection 2 with the traffic light 12, 412 and the mirrors 60 for reflecting sunlight towards the traffic light 12, 412 and/or autonomous vehicle 102a. At step 664, the method further comprises obtaining image data of objects and/or an environment surrounding the autonomous vehicle 102a from the camera(s) 262 of the autonomous vehicle 102a as the autonomous vehicle 102a approaches the traffic light 12, 412 and intersection 2.

At step 666, the method further comprises, as the image data is being captured, manually or automatically changing the operating state of the traffic light 12, 412. For example, as previously described, the operating state of the traffic light 12, 412 can be manually or automatically changed based, for example, on a signal received from a remote control device 32, 432 for manually changing the traffic light state or from an external sensor device, such as proximity sensor 30, 430, for automatically changing the traffic light state when the autonomous vehicle 102a is within a predetermined distance of the traffic light 12, 412.

At step 668, the method can further comprise analyzing the obtained image data using the image analysis software or perception system for analysis of images collected by the camera(s) 262 of the autonomous vehicle 102a to determine whether the image analysis software or perception system correctly identifies the traffic light 12, 412 even when sunlight is reflecting from the traffic light 12, 412 or camera(s) 262 of the autonomous vehicle 102a. The images can also be analyzed to determine whether the image analysis software correctly detects changes in the state of the traffic light 12, 412 despite high reflectance or brightness.

Computer Control System

The on-board computing device 220 of the autonomous vehicle 102a can be implemented using a computer system, such as the exemplary computer system 800 shown in FIG. 8. The computer system 800 can be any computer capable of performing the functions described herein. In a similar manner, processing functions of the system controller 14 and/or traffic light controller 414 can be carried out by the computer system 800. Further, many of the processing and image analysis functions of the methods described herein can be performed by the computer system 800.

With reference to FIG. 8, the computer system 800 includes one or more processors (also called central processing units, or CPUs), such as a processor 804. The processor 804 is connected to a communication infrastructure or bus 806.

One or more processors 804 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

The computer system 800 also includes user input/output device(s) 803, such as monitors, keyboards, pointing devices, etc., that communicate with communication infrastructure 806 through user input/output interface(s) 802.

The computer system 800 also includes a main or primary memory 808, such as random access memory (RAM). The main memory 808 may include one or more levels of cache. The main memory 808 has stored therein control logic (i.e., computer software) and/or data.

The computer system 800 may also include one or more secondary storage devices or memory 810. Secondary memory 810 may include, for example, a hard disk drive 812 and/or a removable storage device or drive 814. Removable storage drive 814 may be a floppy disk drive, a magnetic tape drive, a compact disk drive, an optical storage device, tape backup device, and/or any other storage device/drive.

Removable storage drive 814 may interact with a removable storage unit 818. Removable storage unit 818 includes a computer usable or readable storage device having stored thereon computer software (control logic) and/or data. Removable storage unit 818 may be a floppy disk, magnetic tape, compact disk, DVD, optical storage disk, and/any other computer data storage device. Removable storage drive 814 reads from and/or writes to removable storage unit 818 in a well-known manner.

According to an exemplary embodiment, secondary memory 810 may include other means, instrumentalities, or other approaches for allowing computer programs and/or other instructions and/or data to be accessed by computer system 800. Such means, instrumentalities, or other approaches may include, for example, a removable storage unit 822 and an interface 820. Examples of the removable storage unit 822 and the interface 820 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

The computer system 800 may further include a communication or network interface 824. The communication interface 824 enables computer system 800 to communicate and interact with any combination of remote devices, remote networks, remote entities, etc. (individually and collectively referenced by reference number 828). For example, communication interface 824 may allow the computer system 800 to communicate with remote devices 828 over communications path 826, which may be wired and/or wireless, and which may include any combination of LANs, WANs, the Internet, etc. The control logic and/or data may be transmitted to and from computer system 800 via communication path 826.

In an embodiment, a tangible, non-transitory apparatus or article of manufacture comprising a tangible, non-transitory computer useable or readable medium having control logic (software) stored thereon is also referred to herein as a computer program product or program storage device. This includes, but is not limited to, computer system 800, main memory 808, secondary memory 810, and removable storage units 818 and 822, as well as tangible articles of manufacture embodying any combination of the foregoing. Such control logic, when executed by one or more data processing devices (such as computer system 800), causes such data processing devices to operate as described herein.

Based on the teachings contained in this disclosure, it will be apparent to persons skilled in the relevant art(s) how to make and use embodiments of this disclosure using data processing devices, computer systems, and/or computer architectures other than that shown in FIG. 8. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

The invention claimed is:

1. A traffic light control system configured to provide instructions to at least one traffic light for testing performance of an autonomous vehicle as it approaches the at least one traffic light, the system comprising:
at least one controller comprising a transceiver in communication with the at least one traffic light and a computer-readable memory comprising a plurality of operation routines for the at least one traffic light; and
a manually operable remote control device in electronic communication with the at least one controller for controlling operation of the at least one traffic light,
wherein the at least one controller is configured to:
receive an instruction signal from the remote control device generated in response to a user input;
select at least one operation routine of the plurality of operation routines on the computer-readable memory based on the received instruction signal; and
provide a control signal via the transceiver to the at least one traffic light to control operation of the at least one traffic light according to the selected at least one operation routine based on the instruction signal received from the remote control device,
wherein controlling operation of the at least one traffic light comprises turning on or off at least one of a plurality of light emitters of the at least one traffic light and/or changing a brightness, frequency, or intensity of at least one of the plurality of light emitters of the at least one traffic light.

2. The traffic light control system of claim 1, wherein the at least one traffic light comprises a first light signal comprising a first group of light emitters of the plurality of light emitters, a second light signal comprising a second group of light emitters of the plurality of light emitters, and a third light signal comprising a third group of light emitters of the plurality of light emitters.

3. The traffic light control system of claim 1, wherein the at least one operation routine comprises an instruction to turn on or off specific light emitters of the plurality of light emitters in sequence according to a predetermined pattern.

4. The traffic light control system of claim 1, wherein the at least one operation routine comprises an instruction to reduce a brightness of at least one of the light emitters of the plurality of light emitters to a brightness of less than about 15% of a maximum brightness of the light emitter.

5. The traffic light control system of claim 1, wherein the at least one operation routine comprises an instruction to adjust at least one of a frequency (hz) or a duty cycle of the one or more light emitters of the plurality of light emitters.

6. The traffic light control system of claim 5, wherein adjusting the frequency comprises processing the control signal through an oscilloscope.

7. The traffic control system of claim 1, further comprising a proximity sensor configured to detect a distance between the autonomous vehicle and the at least one traffic light,
wherein the controller is configured to determine when the autonomous vehicle is within a predetermined distance of the at least one traffic light based on information received from the proximity sensor and provide a control signal via the transceiver to the at least one traffic light to control operation of the at least one traffic light when the autonomous vehicle is within the predetermined distance.

8. The traffic control system of claim 7, wherein the proximity sensor comprises a laser range finder that detects a distance between the autonomous vehicle and the at least one traffic light.

9. The traffic control system of claim 7, wherein the controller is configured to control operation of the at least one traffic light by causing light emitters of a first light signal of the at least one traffic light to turn off and causing light emitters of a second light signal of the at least one traffic light to turn on when the autonomous vehicle is within the predetermined distance of the at least one traffic light.

10. The traffic light control system of claim 1, wherein the system is configured to provide instructions to multiple traffic lights in an intersection, and wherein the controller is configured to:
select based on the received instruction signal at least one operation routine of the plurality of operation routines on the computer-readable memory, wherein the selected operation routine comprises instructions for the multiple traffic lights in the intersection; and
provide control signals via the transceiver to the multiple traffic lights to control operation of the multiple traffic lights according to the selected at least one operation routine of the plurality of operation routines.

11. A traffic light control system configured to provide instructions to at least one traffic light for testing performance of an autonomous vehicle as it approaches the at least one traffic light, the system comprising:
at least one controller comprising a transceiver in communication with the at least one traffic light and a computer-readable memory comprising a plurality of operation routines for the at least one traffic light, the controller being configured to:
select at least one operation routine of the plurality of operation routines on the computer-readable memory; and
provide a control signal via the transceiver to the at least one traffic light to control operation of the at least one traffic light according to the selected at least one operation routine, wherein controlling operation of the at least one traffic light comprises turning on or off at least one of a plurality of light emitters of the at least one traffic light and/or changing a brightness, frequency, or intensity of at least one of the plurality of light emitters of the at least one traffic light; and
an exhaust machine for generating at least one of fog, smoke, dust, mist, or expelled particles directed towards the at least one traffic light, wherein the at least one controller is configured to activate the exhaust machine as the at least one autonomous vehicle approaches the at least one traffic light.

12. A traffic light control system configured to provide instructions to at least one traffic light for testing performance of an autonomous vehicle as it approaches the at least one traffic light, the system comprising:
at least one controller comprising a transceiver in communication with the at least one traffic light and a computer-readable memory comprising a plurality of operation routines for the at least one traffic light, the controller being configured to:
select at least one operation routine of the plurality of operation routines on the computer-readable memory; and provide a control signal via the transceiver to the at least one traffic light to control operation of the at least one traffic light according to the selected at least one operation routine, wherein controlling operation of the at least one traffic light comprises turning on or off at least one of a plurality of light emitters of the at least one traffic light and/or changing a brightness, frequency, or intensity of at least one of the plurality of light emitters of the at least one traffic light; and a mounting device for selectively positioning an optical element within a field-of-view of at least one camera of the autonomous vehicle, the mounting device comprising:

a housing defining an interior sized to fit over an aperture of the at least one camera;

a holder for the optical element connected to the housing and positioned such that, when the holder is in a first position, the optical element is at least partially within the field-of-view of the at least one camera; and a motorized actuator in communication with the controller configured to move the holder to adjust the position of the optical element relative to the field-of-view of the at least one camera.

13. A traffic light control system configured to provide instructions to at least one traffic light for testing performance of an autonomous vehicle as it approaches the at least one traffic light, the system comprising:

at least one controller comprising a transceiver in communication with the at least one traffic light and a computer-readable memory comprising a plurality of operation routines for the at least one traffic light, the controller being configured to:

select at least one operation routine of the plurality of operation routines on the computer-readable memory; and provide a control signal via the transceiver to the at least one traffic light to control operation of the at least one traffic light according to the selected at least one operation routine, wherein controlling operation of the at least one traffic light comprises turning on or off at least one of a plurality of light emitters of the at least one traffic light and/or changing a brightness, frequency, or intensity of at least one of the plurality of light emitters of the at least one traffic light; and a motorized winch in electronic communication with the controller for extending or retracting a cable supporting the at least one traffic light to cause the at least one traffic light to swing, wherein the at least one controller is configured to provide instructions to the motorized winch to cause the motorized winch to extend and/or retract the cable.

14. A method for testing or evaluating image analysis software or a perception system of an autonomous vehicle as the autonomous vehicle approaches at least one traffic light, wherein the image analysis software or perception system is configured to analyze images collected by at least one camera of the autonomous vehicle including images of the at least one traffic light, the method comprising:

obtaining image data of objects and/or an environment surrounding the autonomous vehicle from the at least one camera of the autonomous vehicle as the autonomous vehicle approaches the at least one traffic light;

as the image data is being captured, manually or automatically changing an operating state of the at least one traffic light; and analyzing the obtained image data using the image analysis software or perception system for analysis of images collected by the at least one camera of the autonomous vehicle to determine whether the image analysis software or perception system correctly identifies the changed state of the at least one traffic light.

15. The method of claim 14, further comprising analyzing the obtained images to plan a route through an intersection comprising the at least one traffic light, and allowing the autonomous vehicle to proceed past the at least one traffic light into the intersection along the planned route through the intersection.

16. The method of claim 14, further comprising receiving an indication signal from a proximity sensor when the autonomous vehicle is within a predetermined distance of the at least one traffic light, wherein automatically changing the operation state of the at least one traffic light occurs when the indication signal from the proximity sensor is received.

17. The method of claim 14, further comprising receiving an instruction signal from a remote control device indicating an instruction entered by a user and manually changing the operating state of the at least one traffic light based on the instruction signal received from the remote control device.

18. The method of claim 14, further comprising using a mirror to direct sunlight towards the at least one traffic light and/or towards the at least one camera of the autonomous vehicle, and obtaining the image data as the sunlight is reflected towards the at least one traffic light.

* * * * *